United States Patent
Kadono et al.

(10) Patent No.: US 7,912,122 B2
(45) Date of Patent: Mar. 22, 2011

(54) PICTURE CODING METHOD, PICTURE DECODING METHOD, PICTURE CODING APPARATUS, PICTURE DECODING APPARATUS

(75) Inventors: Shinya Kadono, Nishinomiya (JP); Yoshiichiro Kashiwagi, Arcadia, CA (US); Jiuhuai Lu, Palos Verdes Peninsua, CA (US); Chong Soon Lim, Singapore (SG); Tao Chen, Diamond Bar, CA (US)

(73) Assignee: Panasonic Corporation, Osaka (JP)

( * ) Notice: Subject to any disclaimer, the term of this patent is extended or adjusted under 35 U.S.C. 154(b) by 1388 days.

(21) Appl. No.: 10/569,871

(22) PCT Filed: Jan. 19, 2005

(86) PCT No.: PCT/US2005/002227
§ 371 (c)(1),
(2), (4) Date: Feb. 28, 2006

(87) PCT Pub. No.: WO2005/072312
PCT Pub. Date: Aug. 11, 2005

(65) Prior Publication Data
US 2007/0292039 A1    Dec. 20, 2007

Related U.S. Application Data

(60) Provisional application No. 60/538,065, filed on Jan. 20, 2004, provisional application No. 60/561,351, filed on Apr. 12, 2004.

(51) Int. Cl.
*H04N 11/02* (2006.01)
*G06K 9/36* (2006.01)
(52) U.S. Cl. .................................. 375/240.04; 382/232
(58) Field of Classification Search .................. 375/240, 375/240.1–240.6, 242, 244–246, 240.01–240.04; 341/51, 67, 76, 77, 64, 65; 382/232, 233, 244–247, 251; 348/723, 725
See application file for complete search history.

(56) References Cited

U.S. PATENT DOCUMENTS 5,034,965 A    7/1991    Kato
(Continued)

FOREIGN PATENT DOCUMENTS

CN    1088041    6/1994
(Continued)

OTHER PUBLICATIONS

ITU-T Recommendation H.262, International Standard ISO/IEC 13818.2 MPEG-2 Video. Transmission of Non-Telephone Signals. Information Technology—Generic Coding of Moving Pictures and Associated Audio Information: Video. ITU-T Telecommunication Standarization Sector of ITU, Geneva, Switzerland, Jul. 1, 1995, pp. 54-55, 68.

(Continued)

*Primary Examiner* — Tesfaldet Bocure

(57) ABSTRACT

The picture coding method according to the present invention is a picture coding method for coding a picture on a block-by-block basis through orthogonal transformation and quantization, and coding a quantization matrix that is used to derive quantization steps for frequencies of orthogonal transformation coefficients, the method comprising: calculating a difference value between each of frequency components included in the quantization matrix and a predetermined value corresponding to said each of the frequency components; and coding the difference value into a variable length code, wherein a code length of the variable length code is shorter as the difference value is smaller, or equal to a code length of a neighboring difference value of said difference value.

7 Claims, 17 Drawing Sheets

U.S. PATENT DOCUMENTS

| | | | |
|---|---|---|---|
| 5,241,383 A | 8/1993 | Chen et al. | |
| 5,392,037 A | 2/1995 | Kato | |
| 5,500,677 A | 3/1996 | Fert | |
| 5,515,105 A * | 5/1996 | Lim | 375/240.04 |
| 5,742,342 A | 4/1998 | Jung | |
| 6,445,739 B1 * | 9/2002 | Shen et al. | 375/240.03 |
| 6,577,681 B1 | 6/2003 | Kimura | |
| 6,928,113 B1 | 8/2005 | Mihara | |
| 6,963,606 B1 | 11/2005 | Yanagihara et al. | |
| 7,082,163 B2 | 7/2006 | Uenoyama et al. | |
| 2002/0085636 A1 | 7/2002 | Uenoyama et al. | |
| 2002/0114388 A1 | 8/2002 | Ueda et al. | |
| 2004/0234150 A1 | 11/2004 | Chang | |
| 2009/0010334 A1 | 1/2009 | Ueda et al. | |

FOREIGN PATENT DOCUMENTS

| | | |
|---|---|---|
| CN | 1158058 | 8/1997 |
| CN | 1243636 | 2/2000 |
| CN | 1354605 | 6/2002 |
| EP | 0 777 387 | 6/1997 |
| JP | 02-216917 | 8/1990 |
| JP | 04-343576 | 11/1992 |
| JP | 02-235778 | 9/1993 |
| JP | 10-276097 | 10/1998 |
| JP | 11-088880 | 3/1999 |
| JP | 2001-258029 | 9/2001 |
| JP | 2001-359107 | 12/2001 |
| WO | 98/35503 | 8/1998 |

OTHER PUBLICATIONS

"General Image Compression Coding Principle of MPEG-2"; Sep. 1997; pp. 13-15; © China Academic Journal Electronic Publishing House 1994-2006; with English translation.

Yun Q. Shi, Huifant Sun: "Image and Video Compression for Multimedia Engineering" CRC Press, 2000, pp. 55-60.

* cited by examiner

FIG. 2

Low frequency   Horizontal high frequency

| 8  | 16 | 19 | 22 | 26 | 27 | 29 | 34 |
|----|----|----|----|----|----|----|----|
| 16 | 16 | 22 | 24 | 27 | 29 | 34 | 37 |
| 19 | 22 | 26 | 27 | 29 | 34 | 34 | 38 |
| 22 | 22 | 24 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

Vertical high frequency

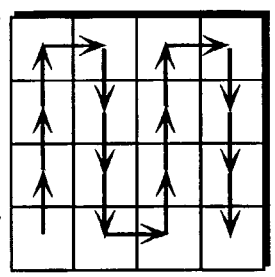
FIG. 5A
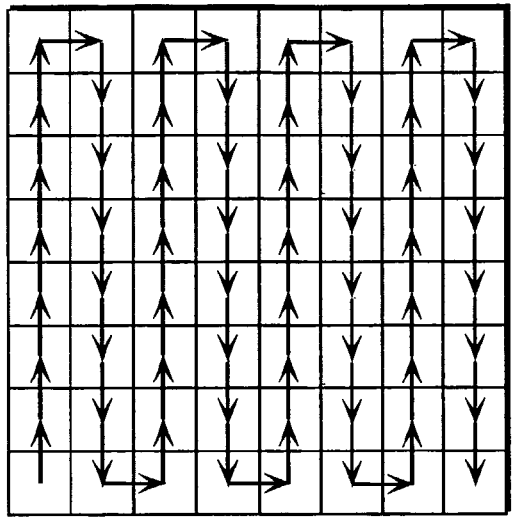
FIG. 5C
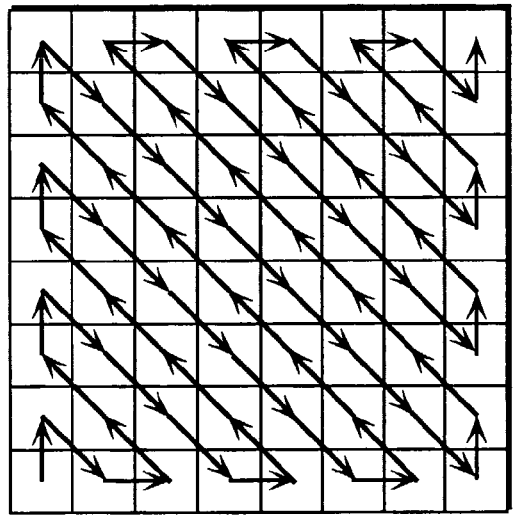
FIG. 5B
FIG. 5D

FIG. 6C

| W[i] | → | D[i] | → | Code |
|---|---|---|---|---|
| W[0]=16 | → | D[0]=8 | → | 0001000 |
| W[1]=18 | → | D[1]=2 | → | 00100 |
| W[2]=18 | → | D[2]=0 | → | 1 |
| W[3]=21 | → | D[3]=3 | → | 00100 |
| W[4]=20 | → | D[4]=-1 | → | 011 |
| ... | | ... | | ... |
| W[30]=64 | → | D[30]=0 | → | |
| W[31]=64 | → | D[31]=0 | → | |
| ... | | ... | | → End code |
| W[62]=64 | → | D[62]=0 | → | |
| W[63]=64 | → | D[63]=0 | → | |

FIG. 6A

| W[0]= 16 | W[1]= 18 | ... |
|---|---|---|
| W[2]= 18 | W[4]= 20 | ... |
| W[3]= 21 | | ... |

FIG. 6B

| D[0]= 8 | D[1]= 2 | ... |
|---|---|---|
| D[2]= 0 | D[4]= -1 | ... |
| D[3]= 3 | | ... |

FIG. 8A

| code | value |
|---|---|
| 1 | 1 |
| 010 | 2 |
| 011 | 3 |
| 00100 | 4 |
| 00101 | 5 |
| 00110 | 6 |
| 00111 | 7 |

000···001 $X_0 X_1 X_2 \cdots X_{N-1}$
N zeros

Value=$2^N+X_0 X_1 X_2 \cdots X_{N-1}$

FIG. 8B

| code | value |
|---|---|
| 1 | K |
| 010 | K+1 |
| 011 | K-1 |
| 00100 | K+2 |
| 00101 | K-2 |
| 00110 | K+3 |
| 00111 | K-3 |

000···001 $X_0 X_1 X_2 \cdots X_{N-1}$
N zeros if (N==0)
  value = K
else
  value = K+$(-1)^{X_{N-1}}$·
  ($2^{N-1}+X_0 X_1 X_2 \cdots X_{N-1}$)

FIG. 8C

| code | value |
|---|---|
| 1 | 0 |
| 010 | 1 |
| 011 | -1 |
| 00100 | 2 |
| 00101 | -2 |
| 00110 | 3 |
| 00111 | -3 |

000···001 $X_0 X_1 X_2 \cdots X_{N-1}$
N zeros if (N==0)
  value = 0
else
  value = $(-1)^{X_{N-1}}$·
  ($2^{N-1}+X_0 X_1 X_2 \cdots X_{N-2}$)

FIG. 9A

| $W_{00}$ | $W_{01}$ | $W_{02}$ | $W_{03}$ | $W_{04}$ | $W_{05}$ | $W_{06}$ | $W_{07}$ |
|---|---|---|---|---|---|---|---|
| $W_{10}$ | $W_{11}$ | $W_{12}$ | $W_{13}$ | $W_{14}$ | $W_{15}$ | $W_{16}$ | $W_{17}$ |
| $W_{20}$ | $W_{21}$ | $W_{22}$ | $W_{23}$ | $W_{24}$ | $W_{25}$ | $W_{26}$ | $W_{27}$ |
| $W_{30}$ | $W_{31}$ | $W_{32}$ | $W_{33}$ | $W_{34}$ | $W_{35}$ | $W_{36}$ | $W_{37}$ |
| $W_{40}$ | $W_{41}$ | $W_{42}$ | $W_{43}$ | $W_{44}$ | $W_{45}$ | $W_{46}$ | $W_{47}$ |
| $W_{50}$ | $W_{51}$ | $W_{52}$ | $W_{53}$ | $W_{54}$ | $W_{55}$ | $W_{56}$ | $W_{57}$ |
| $W_{60}$ | $W_{61}$ | $W_{62}$ | $W_{63}$ | $W_{64}$ | $W_{65}$ | $W_{66}$ | $W_{67}$ |
| $W_{70}$ | $W_{71}$ | $W_{72}$ | $W_{73}$ | $W_{74}$ | $W_{75}$ | $W_{76}$ | $W_{77}$ |

FIG. 9B

Header | Weighting Matrix $W_{00}$ | $W_{01}$ | $W_{10}$ | $W_{20}$ | . | . | . | . | $W_{77}$

FIG. 9C

Header | Weighting Matrix $W_{00}$ | $W_{01}$ | $W_{02}$ | $W_{03}$ | . | . | . | . | $W_{77}$

PICTURE CODING METHOD, PICTURE DECODING METHOD, PICTURE CODING APPARATUS, PICTURE DECODING APPARATUS

CROSS REFERENCE TO RELATED APPLICATIONS

This application claims the benefit of U.S. Provisional Application No. 60/538,065, filed Jan. 20, 2004, and the benefit of U.S. Provisional Application No. 60/561,351, filed Apr. 12, 2004 the contents of which are herein incorporated by reference in its entirety.

TECHNICAL FIELD

The present invention relates to a picture coding method for efficiently compressing moving pictures and to a picture decoding method for correctly decoding such compressed moving pictures, as well as to a picture coding apparatus, a picture decoding apparatus, and a program thereof.

BACKGROUND ART

In the age of multimedia which integrally handles audio, video and other pixel values, existing information media, i.e., newspaper, magazine, television, radio, telephone and other means through which information is conveyed to people, have recently come to be included in the scope of multimedia. Generally, multimedia refers to something that is represented by associating not only characters, but also graphics, audio, and especially pictures and the like together. However, in order to include the aforementioned existing information media into the scope of multimedia, it appears as a prerequisite to represent such information in digital form.

However, when calculating the amount of information contained in each of the aforementioned information media as the amount of digital information, while the amount of information per character is 1 to 2 bytes in the case of characters, the amount of information to be required is 64 Kbits per second in the case of audio (telephone quality), and 100 Mbits per second in the case of moving pictures (current television reception quality). Therefore, it is not realistic for the aforementioned information media to handle such an enormous amount of information as it is in digital form. For example, although video phones are already in the actual use by using Integrated Services Digital Network (ISDN) which offers a transmission speed of 64 Kbits/s to 1.5 Mbits/s, it is not practical to transmit video of televisions and cameras directly through ISDN.

Against this backdrop, information compression techniques have become required, and moving picture compression techniques compliant with H.261 and H.263 standards recommended by ITU-T (International Telecommunication Union-Telecommunication Standardization Sector) are employed for video phones, for example. Moreover, according to information compression techniques compliant with the MPEG-1 standard, it is possible to store picture information into an ordinary music CD (compact disc) together with sound information.

Here, MPEG (Moving Picture Experts Group) is an international standard on compression of moving picture signals standardized by ISO/IEC (International Organization for Standardization, International Electrotechnical Commission), and MPEG-1 is a standard for compressing television signal information approximately into one hundredth so that moving picture signals can be transmitted at a rate of 1.5 Mbit/s. Furthermore, since a transmission speed achieved by the MPEG-1 standard is a middle-quality speed of about 1.5 Mbit/s, MPEG-2, which was standardized with a view to satisfying requirements for further improved picture quality, allows data transmission equivalent in quality to television broadcasting through which moving picture signals are transmitted at a rate of 2 to 15 Mbit/s. Moreover, MPEG-4 was standardized by the working group (ISO/IEC HTC1/SC29/WG11) which promoted the standardization of MPEG-1 and MPEG-2. MPEG-4, which provides a higher compression ratio than that of MPEG-1 and MPEG-2 and which enables an object-based coding/decoding/operation, is capable of providing a new functionality required in this age of multimedia. At the beginning stage of standardization, MPEG-4 aimed at providing a low bit rate coding method, but it has been extended as a standard supporting more general coding that handles interlaced images as well as high bit rate coding. Currently, an effort has been made jointly by ISO/IEC and ITU-T for standardizing MPEG-4 AVC and ITU-T H.264 as picture coding methods of the next generation that offer a higher compression ratio. As of August 2002, a committee draft (CD) is issued for a picture coding method of the next generation.

In general, in coding of a moving picture, the amount of information is compressed by reducing redundancies in temporal and spatial directions. Therefore, in inter picture prediction coding aiming at reducing temporal redundancies, motion estimation and the generation of a predicative image are carried out on a block-by-block basis with reference to forward or backward picture(s), and coding is then performed on the difference value between the obtained predictive image and an image in the current picture to be coded. Here, "picture" is a term denoting one image. In the case of a progressive image, "Picture" means a frame, whereas it means a frame or fields in the case of an interlaced image. Here, "interlaced image" is an image of a frame composed of two fields which are separated in capture time. In coding and decoding of an interlaced image, it is possible to handle one frame as a frame as it is, as two fields, or as a frame structure or a field structure on a per-block basis within the frame.

A picture to be coded using intra picture prediction without reference to any pictures shall be referred to as an I picture. A picture to be coded using inter picture prediction with reference to only one picture shall be referred to as a P picture. And, a picture to be coded using inter picture prediction with reference to two pictures at the same time shall be referred to as a B picture. It is possible for a B picture to refer to two pictures which can be arbitrarily combined from forward/backward pictures in display order. Reference images (reference pictures) can be determined for each block serving as a basic coding/decoding unit. Distinction shall be made between such reference pictures by calling a reference picture to be described earlier in a coded bitstream as a first reference picture, and by calling a reference picture to be described later in the bitstream as a second reference picture. Note that as a condition for coding and decoding these types of pictures, pictures used for reference are required to be already coded and decoded.

P pictures and B pictures are coded using motion compensated inter picture prediction. Coding by use of motion compensated inter picture prediction is a coding method that employs motion compensation in inter picture prediction coding. Unlike a method for performing prediction simply based on pixel values in a reference picture, motion estimation is a technique capable of improving prediction accuracy as well as reducing the amount of data by estimating the amount of motion (hereinafter referred to as "motion vector")

of each part within a picture and further by performing prediction in consideration of such amount of motion. For example, it is possible to reduce the amount of data through motion compensation by estimating motion vectors of the current picture to be coded and then by coding prediction residuals between prediction values obtained by shifting only the amount of the respective motion vectors and the current picture to be coded. In this technique, motion vectors are also recorded or transmitted in coded form, since motion vector information is required at the time of decoding.

Motion vectors are estimated on a per-macroblock basis. More specifically, a macroblock shall be previously fixed in the current picture to be coded, so as to estimate motion vectors by finding the position of the most similar reference block of such fixed macroblock within the search area in a reference picture.

FIG. 1 is a diagram illustrating an example data structure of a bitstream. As FIG. 1 shows, the bitstream has a hierarchical structure such as below. The bitstream (Stream) is formed of more than one group of pictures (GOP). By using GOPs as basic coding units, it becomes possible to edit a moving picture as well as to make a random access. Each GOP is made up of plural pictures, each of which is one of I picture, P picture, and B picture. Each picture is further made up of plural slices. Each slice, which is a strip-shaped area within each picture, is made up of plural macroblocks. Moreover, each stream, GOP, picture, and slice includes a synchronization signal (sync) for indicating the ending point of each unit and a header (header) which is data common to said each unit.

Note that when data is carried not in a bitstream being a sequence of streams, but in a packet and the like being a piecemeal unit, the header and the data portion, which is the other part than the header, may be carried separately. In such case, the header and the data portion shall not be incorporated into the same bitstream, as shown in FIG. 1. In the case of a packet, however, even when the header and the data portion are not transmitted contiguously, it is simply that the header corresponding to the data portion is carried in another packet. Therefore, even when the header and the data portion are not incorporated into the same bitstream, the concept of a coded bitstream described with reference to FIG. 1 is also applicable to packets.

Generally speaking, the human sense of vision is more sensitive to the low frequency components than to the high frequency components. Furthermore, since the energy of the low frequency components in a picture signal is larger than that of the high frequency components, picture coding is performed in order from the low frequency components to the high frequency components. As a result, the number of bits required for coding the low frequency components is larger than that required for the high frequency components.

In view of the above points, the existing coding methods use larger quantization steps for the high frequency components than for the low frequency components when quantizing transformation coefficients, which are obtained by orthogonal transformation, of the respective frequencies. This technique has made it possible for the conventional coding methods to achieve a large increase in compression ratio with a small loss of picture quality from the standpoint of viewers.

Meanwhile, since quantization step sizes of the high frequency components with regard to the low frequency components depend on picture signal, a technique for changing the sizes of quantization steps for the respective frequency components on a picture-by-picture basis has been conventionally employed. A quantization matrix is used to derive quantization steps of the respective frequency components.

FIG. 2 shows an example quantization matrix. In this drawing, the upper left component is a DC component, whereas rightward components are horizontal high frequency components and downward components are vertical high frequency components. The quantization matrix in FIG. 2 also indicates that a larger quantization step is applied to a larger value. Usually, it is possible to use different quantization matrices for each picture. The value indicating the size of a quantization step of each frequency component is fixed length-coded. Note that it is usual that each component of a quantization matrix and the value of each quantization step are approximately proportional to each other, but it is not necessary to stick to such relationship as long as the correspondence between them is clearly defined.

However, such conventional methods have a problem that coding efficiency is lowered by simply performing fixed length coding due to the fact that the values of the respective frequency components of a quantization matrix center within a certain range.

DISCLOSURE OF INVENTION

It is an object of the present invention to provide a picture coding method, a picture decoding method, a picture coding apparatus, a picture decoding apparatus, and a program that are capable of improving the efficiency of quantization matrix coding.

In order to achieve the above object, the picture coding method according to the present invention is a picture coding method for coding a picture on a block-by-block basis through orthogonal transformation and quantization, and coding a quantization matrix that is used to derive quantization steps for frequencies of orthogonal transformation coefficients, the method comprising: calculating a difference value between each of frequency components included in the quantization matrix and a predetermined value corresponding to said each of the frequency components; and coding the difference value into a variable length code, wherein a code length of the variable length code is shorter as the difference value is smaller, or equal to a code length of a neighboring difference value of said difference value. Here, the predetermined value may be the value of the most-frequently occurring high frequency component or a constant indicating an average value of the frequency components or a value previously determined for each frequency component.

With the above construction, since a difference value between each frequency component and a predetermined value is calculated, the resulting difference values are smaller than the frequency components, and since not the frequency components themselves but the difference values are coded, it becomes possible to shorten the code length of each variable length code and therefore to improve coding efficiency.

Here, the predetermined value may be a value of a frequency component corresponding to an immediately previous difference value.

With the above construction, since there is usually a correlation between a frequency component and the previous frequency component, it is possible for each difference value to take a further smaller value and therefore to further improve coding efficiency.

Here, difference values may be calculated in order from low frequencies to high frequencies of the frequency components included in the quantization matrix.

With the above construction, since frequency components are coded from the lower frequencies to the higher frequencies, it is highly probable that each frequency component and its previous frequency component take similar values. Therefore, it becomes possible for each difference value to take a further smaller value in a more reliable manner and therefore to further improve coding efficiency.

Here, each of the difference values may be represented as a remainder of 2 raised to a power of k (k is a constant).

With the above construction, in the case where each difference value is represented as a remainder that results from dividing each difference value by 2 raised to a power of k (k=8), it becomes possible for them to take small values that can be represented virtually by 8 bits and therefore to further reduce the number of variable length code bits.

Here, the above picture coding method may further comprise: judging whether or not there exist consecutive difference values 0 corresponding to a latter part of the quantization matrix; and coding difference values up to an immediately previous difference value of a top difference value 0 into variable length codes, when the judgment is that there exist consecutive difference values 0, without coding the consecutive difference values 0 into variable length codes.

Here, the above picture coding method may further comprise adding an end code after the variable length code of the immediately previous difference value of the top difference value 0.

With the above constructions, in the case where there are consecutive frequency components with the same value at the last of a quantization matrix, only one variable length code is generated for such plurality of frequency components, rather than generating a plurality of variable length codes with the same bit string. Accordingly, it becomes possible to further improve coding efficiency. In this case, by adding an end code, it becomes also possible to improve the efficiency of decoding performed by a picture decoding apparatus.

Furthermore, in order to achieve the above object, the picture decoding method according to the present invention is a picture decoding method for decoding a coded picture on a block-by-block basis through inverse quantization and inverse orthogonal transformation, and decoding a variable-length coded quantization matrix, the method comprising: variable-length decoding the quantization matrix into a difference value corresponding to each of frequency components included in said quantization matrix; and calculating each of the frequency components of the quantization matrix by adding the difference value to a predetermined value corresponding to said each of the frequency components, wherein a code length of a variable length code of the difference value is shorter as the difference value is smaller, or equal to a code length of a neighboring difference value of said difference value.

Here, the predetermined value may be a value of a frequency component that is calculated by an immediately previous addition.

Here, additions may be performed in order from low frequencies to high frequencies of the frequency components included in the quantization matrix.

Here, each of the frequency components may be represented as a remainder of 2 raised to a power of k (k is a constant).

With the above constructions, it becomes easy to decode variable length bit strings with which it is possible to improve coding efficiency, through the above coding method.

Here, in the case where an end code is detected from the variable-length coded quantization matrix, a value that is the same as a value of an immediately previous frequency component of the end code may be outputted as a value of each of the subsequent frequency components.

With the above construction, in the case where there are consecutive frequency components with the same value at the last of a quantization matrix, it becomes possible to decode only one variable length code to obtain all of such plurality of frequency components. Furthermore, an end code makes it possible to easily judge that there are consecutive frequency components with the same value at the last of a quantization matrix.

Note that the picture coding apparatus, picture decoding apparatus, and program according to the present invention also have the same constructions as well as the same effects as above.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 2 is a diagram showing an example quantization matrix;

FIGS. 5A to 5D are diagrams, each showing an order of coding a quantization matrix;

FIG. 6A is a diagram showing a concrete example of component values of a quantization matrix;

FIG. 6B is a diagram showing a concrete example of difference values in a process of coding a quantization matrix;

FIG. 6C is a diagram showing a concrete example of codes through processes of calculating difference values from frequency components and coding variable length codes;

FIG. 8A is a diagram showing a concrete example of variable length coding in the case where difference values are positive;

FIG. 8B is a diagram showing a concrete example of variable length coding in the case where difference values are signed values;

FIG. 8C is a diagram showing a concrete example of variable length coding;

FIG. 9A is a diagram showing an arrangement of frequency components of a quantization matrix;

FIGS. 9B and 9C are diagrams showing how each coded data of the frequency components of the quantization matrix is arranged in a header;

BEST MODE FOR CARRYING OUT THE INVENTION

First Embodiment

Referring to FIGS. 3 to 17, the first embodiment of the present invention is described.

Figure 3:
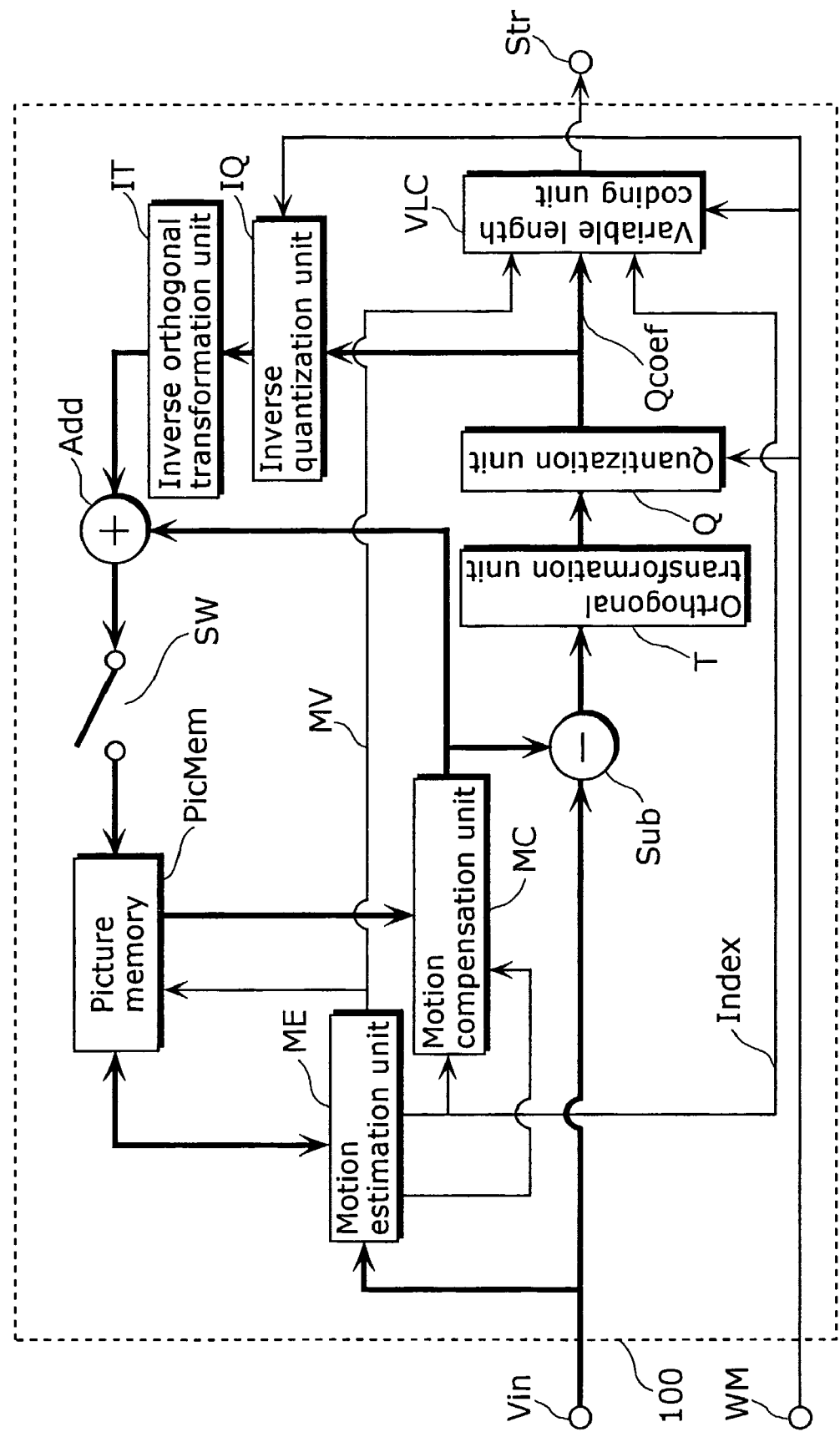
FIG. 3 is a block diagram showing a construction of a picture coding apparatus.

FIG. 3 is a block diagram showing the construction of a picture coding apparatus according to the first embodiment of the present invention.

A picture coding apparatus 1 is an apparatus for performing compression coding on an input picture signal Vin and outputting a coded picture signal Str which has been coded into a bitstream by performing variable length coding and the like. Such picture coding apparatus 1 is comprised of a motion estimation unit ME, a motion compensation unit MC, a subtraction unit Sub, an orthogonal transformation unit T, a quantization unit Q, an inverse quantization unit IQ, an inverse orthogonal transformation unit IT, an addition unit Add, a picture memory PicMem, a switch SW, and a variable length coding unit VLC.

The picture signal Vin is inputted to the subtraction unit Sub and the motion estimation unit ME. The subtraction unit Sub calculates a residual, image between each image in the input picture signal Vin and each predictive image on a block-by-block basis, and outputs the calculated residual image to the orthogonal transformation unit T. The orthogonal transformation unit T performs orthogonal transformation on the residual image to transform it into frequency coefficients, and outputs them to the quantization unit Q.

The quantization unit Q quantizes the frequency coefficients of each block that are inputted from the subtraction unit Sub, using quantization steps that are derived by reference to a quantization matrix WM, and outputs the resulting quantized values Qcoef to the variable length coding unit VLC.

The inverse quantization unit IQ performs inverse quantization on the quantized values Qcoef using quantization steps that are derived by reference to the quantization matrix WM, so as to turn them into the frequency coefficients, and outputs them to the inverse orthogonal transformation unit IT. The inverse orthogonal transformation unit IT performs inverse frequency transformation on the frequency coefficients so as to transform them into a residual image, and outputs it to the addition unit Add. The addition unit Add adds each residual image and each predictive image outputted from the motion estimation unit MC, so as to form a decoded image. The switch SW turns ON when it is indicated that such decoded image should be stored, and such decoded image is to be stored into the picture memory PicMem.

Meanwhile, the motion estimation unit ME, which receives the picture signal Vin on a macroblock basis, detects an image area closest to such input image signal Vin from among decoded pictures stored in the picture memory PicMem, and determines motion vector(s) MV indicating the position of such area. Motion vectors are estimated for each block, which is obtained by further dividing a macroblock. When this is done, it is possible to use more than one picture as reference pictures. Here, since a plurality of pictures can be used as reference pictures, identification numbers (reference index Index) to identify the respective reference pictures are required on a block-by-block basis. The association between a reference index and the picture number of each picture stored in the picture memory PicMem makes it possible for a reference picture to be designated.

The motion compensation unit MC reads out an optimum picture as a predictive picture from among the decoded pictures stored in the picture memory PicMem, based on the motion vectors detected in the above processing and on the reference indices Index.

The variable length coding unit VLC performs variable length coding on each of the quantization matrices WM, quantized values Qcoef, reference indices Index, and motion vectors MV so as to output them as a coded stream Str. In order to do this, the variable length coding unit VLC includes a first coding unit and a second coding unit. The first coding unit (hereinafter referred to as "WM coding unit") performs variable length coding on each quantization matrix WM, whereas the second coding unit performs variable length coding on data other than the quantization matrices WM, i.e., each of the quantized values Qcoef, reference indices Index, and motion vectors MV. The WM coding unit calculates a difference value between each frequency component in each quantization matrix and a predetermined value corresponding to such frequency component, and codes such calculated difference into a variable length code. The smaller the different value, the shorter the length of the resulting variable length code becomes, excluding some exceptions.

Figure 4:
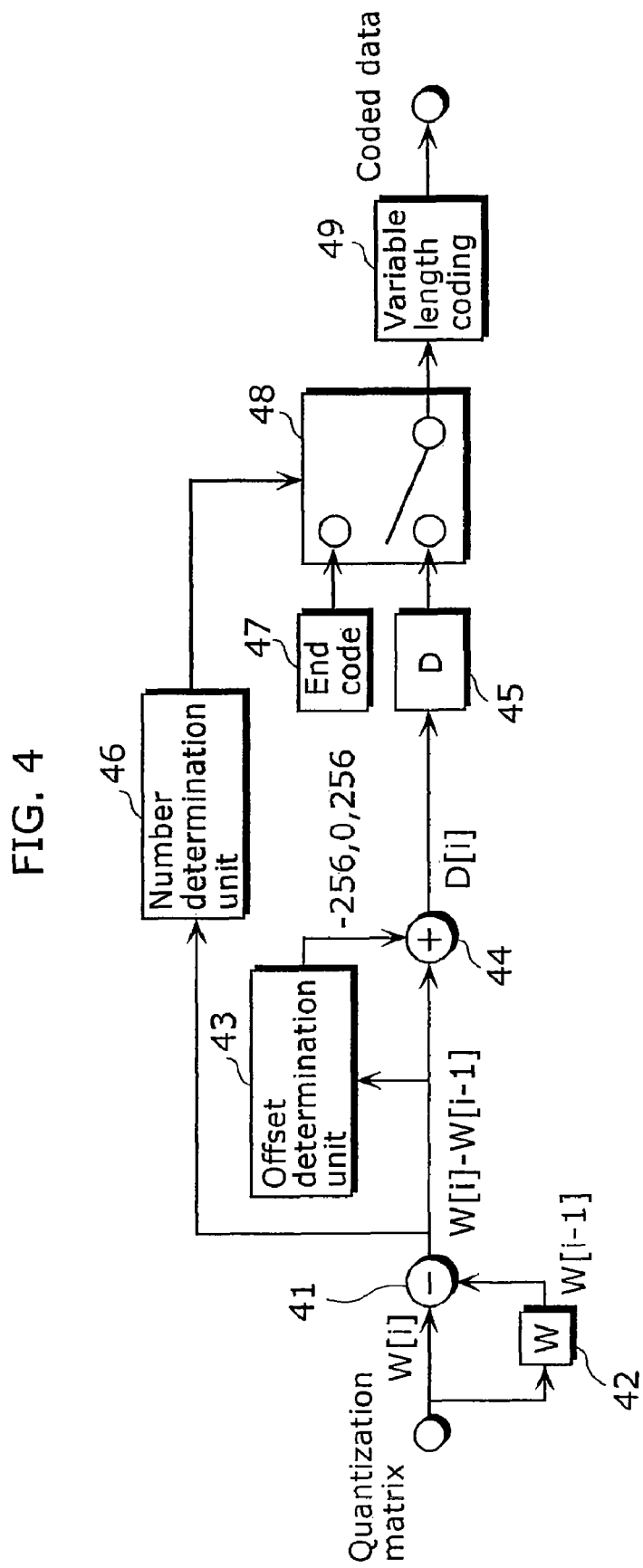
FIG. 4 is a block diagram showing a construction of a WM coding unit.

FIG. 4 is a block diagram showing the construction of the WM coding unit. As this drawing shows, the WM coding unit is comprised of a subtraction unit 41, a W buffer 42, an offset determination unit 43, an addition unit 44, a block buffer 45, a number determination unit 46, an end code holding unit 47, a switch 48, and a variable length coding unit 49.

The subtraction unit 41 calculates a difference value between each frequency component in the quantization matrix and a predetermined value corresponding to such frequency component. Here, the predetermined value may be the value of the most-frequently occurring high-frequency component or a constant indicating an average value of the frequency components or a value previously determined for each frequency component. In the present embodiment, the frequency component value corresponding to the previously determined difference value is used as a predetermined value. In this case, the subtraction unit 41 calculates a difference value between the current frequency component W[i] inputted from outside and the previous frequency component W[i−1] held in the W buffer 42. Since there is usually a correlation between the frequency component W[i] and the previous frequency component W[i−1], latter difference values become smaller. Note that "W[i]" indicates that this is the i-th frequency component in coding order to be coded.

FIGS. 5A to 5D are diagrams, each showing an example order of the frequency components of a quantization matrix to be inputted to the subtraction unit 41. These orders indicate a scanning order in which a quantization matrix to be inputted to the subtraction unit 41 is scanned. Orthogonal transformation in picture coding is most frequently performed for each 4×4 pixels or for each 8×8 pixels. In view of this, FIGS. 5A and 5B illustrate an example of 4×4 pixels and FIGS. 5C and 5D illustrate an example of 8×8 pixels. Since each frequency component in a quantization matrix is coded on an individual basis according to one of the patterns shown in FIGS. 8A, 8B, and 8C, there is no difference in coding efficiency regardless of whether coding is performed from lower frequency components to higher frequency components as shown in FIGS. 5A and 5C or simply in horizontal order as shown in FIGS. 5B and 5D.

FIG. 6A is a diagram showing some of the frequency components of a quantization matrix inputted to the subtraction unit 41. W[0], W[1], W[2], W[3], . . . shown in this drawing are in coding order shown in FIG. 5B.

The W buffer 42 is a buffer for holding the previous frequency component W[i−1]. Before coding starts, the W buffer 42 holds, as an initial value W[−1], a value that is most typically used as a DC component. In the present embodiment, 8 is used as the initial value W[−1]. Note that the W buffer 42 may hold a predetermined value K that corresponds to each frequency component, instead of holding the previous frequency component W[i−1].

The offset determination unit 43 determines an offset value that is used to convert the difference value (W[i]−W[i−1]) inputted from the subtraction unit 41 into a remainder by dividing such difference by 2 raised to a power of k, where k=8 in this case. More specifically, the offset determination unit 43 outputs one of −256, 0, and 256 so that a result of adding an offset value to (W[i]−W[i−1]) falls within the range of values between −128 and 127.

The addition unit 44 calculates a difference value D[i] by adding the difference value (W[i]−W[i−1]) from the subtraction unit 41 to the offset value from the offset determination unit 43. Note that "D[i]" indicates that this is the i-th difference value in coding order to be coded.

FIG. 6B is a diagram showing an example of difference values D[i] calculated by the addition unit 44. In this drawing, the difference values D[0], D[1], D[2], D[3], . . . correspond to the frequency components W[0], W[1], W[2], W[3], . . . shown in FIG. 6A, respectively.

The block buffer 45 is a buffer for holding difference values D[i] inputted from the addition unit 44 equivalent to one block corresponding to one quantization matrix.

The number determination unit 46 counts the number of difference values 0 (W[i]−W[i−1]=0) that exist consecutively at the last of scanning order (at the last of the block), and controls the switch 48 so that D[0] to D[M] held in the block buffer 45 are outputted. Here, D[M] is the previous difference value of the top difference value 0 of the above consecutive difference values 0.

The end code holding unit 47 holds an end code that indicates the end of the variable length codes of a quantization matrix. Any value that cannot be difference values D[i] may serve as an end code.

The switch 48 selects "block buffer output" so that D[0] to D[M] held in the block buffer 45 are outputted, and then selects "end code holding unit output" so that one end code is outputted from the end code holding unit 47. In other words, the switch 48 outputs the following: the difference values starting with the difference value D[0] corresponding to the top frequency component of a quantization matrix through to the difference value D[M] at the previous difference value of the consecutive difference values 0 that exist at the last of the quantization matrix; and one end code. Note that the switch 48 does not output an end code in the case where the number of consecutive difference values 0 (W[i]−W[i−1]=0) counted by the number determination unit 46 is zero, the consecutive difference values existing at the end of the scanning order (at the last of the block).

The variable length coding unit 49 performs variable length coding on the difference values inputted from the block buffer 45 via the switch 48 and on the end code so that the length of the resulting codes becomes shorter, or equal to a neighboring difference value as the difference values are smaller.

FIG. 6C is a diagram showing a concrete example of codes resulting from the coding performed by the variable length coding unit 49 using codes shown in FIG. 8C. In this drawing, W[0] to W[4], and D[0] to D[4] correspond to FIGS. 6A and 6B. The variable length coding unit 49 performs coding so that the code length becomes 1 bit when the difference value is 0 and the code length becomes 3 bits when the difference value is 1, for example. As this example implies, variable length coding performed by the variable length coding unit 49 results in shorter code length as the difference value is smaller. Furthermore, all of the frequency components from W[30] to W[63] take the same value of 64, in which case their difference values D[30] to D[63] become all 0. In this case, no coding is performed on these difference values D[30] to D[63], and variable length coding is performed on the end code instead of on the code "1" for 0 of the difference value D[30].

Figure 7:
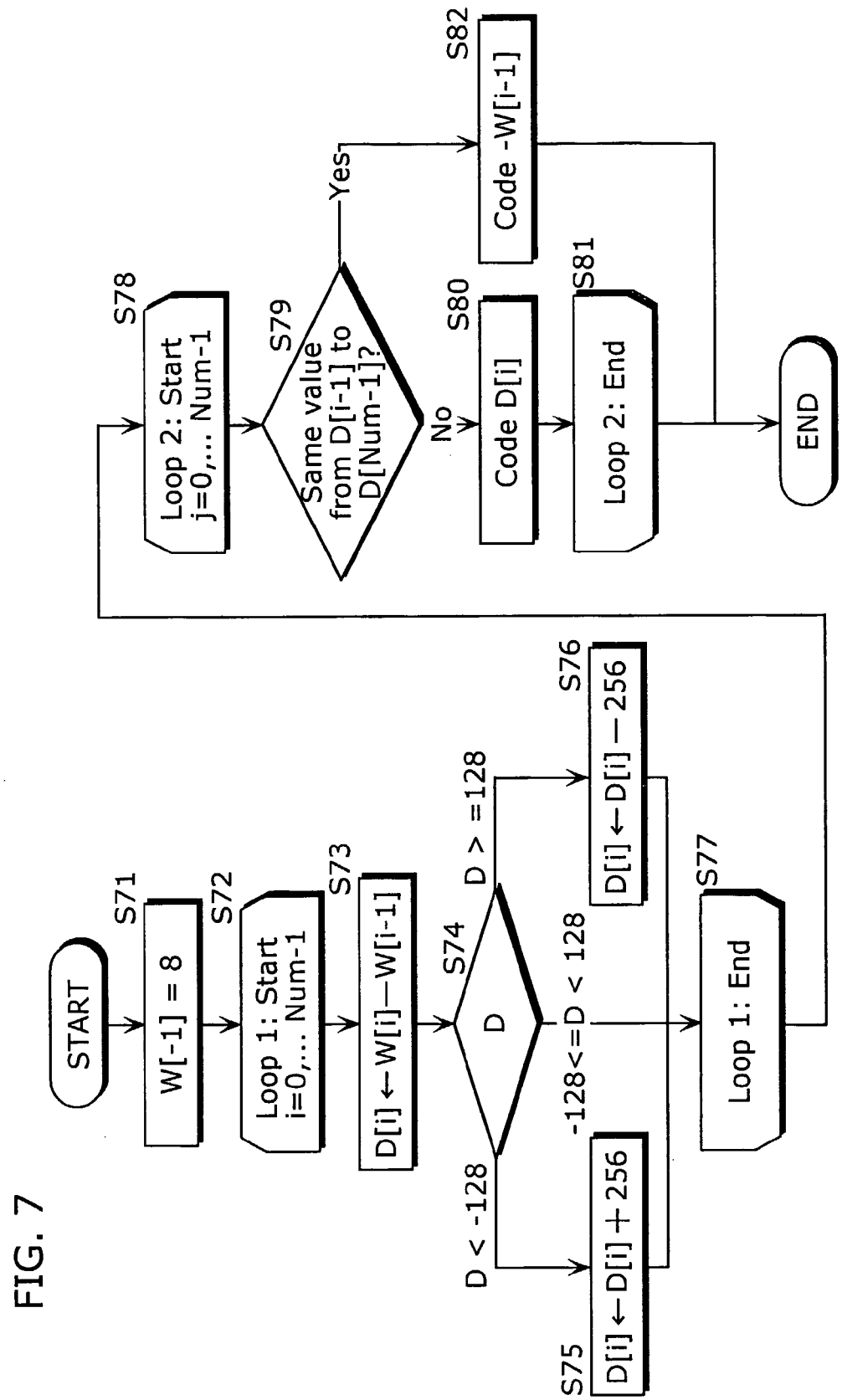
FIG. 7 is a flowchart showing coding processing performed by the WM coding unit.

FIG. 7 is a flowchart showing detailed coding processing performed by the WM coding unit for coding a quantization matrix. In this flowchart, "Num" denotes the number of frequency components (e.g., 16, 64) in the quantization matrix, whereas "i" and "j" denote variables used to count from 0 to (Num−1).

First, the WM coding unit causes the W buffer 42 to hold the initial value W[−1] (e.g., 8) (S71), calculates a difference value of each frequency component of the quantization matrix through processes shown as a loop 1 (S72 to S77), and stores the resulting difference value into the block buffer 45. Then, the WM coding unit performs variable length coding on each difference value through processes shown as a loop 2 (S78 to S81).

In the loop 1, the subtraction unit 41 calculates a difference value D between the current frequency component W[i] inputted from outside and the previous frequency component W[i−1] held in the W buffer 42 (S73). The offset determination unit 43 determines an offset value used to convert the difference D inputted from the subtraction unit 41 into a remainder by dividing such difference D by 2 raised to a power of k, where k=8 in this case (S74). For example, in the case where W[i] takes a value in the range between −256 and +254, the offset determination unit 43 makes the following determination: the offset value should be −256 when D is 128 or greater; the offset value should be 256 when D is smaller than −128; and the offset value should be 0 when D takes another value in the above range. As a result, a value that is determined by adding an offset value to D (i.e., D[i]) becomes a remainder within the range between −128 and +127, where not only positive values but also negative values are included. Since a value taken by a difference value D[i] becomes smaller through this process, the length of a variable length code of D[i] obtained by performing coding using a code shown in FIG. 8C becomes shorter accordingly.

The addition unit 44 calculates a difference value D[i] by adding the difference value D (=W[i]−W[i−1]) from the subtraction unit 41 to an offset value from the offset determination unit 43 (S75 and S76).

In the loop 2, the number determination unit 46 determines the number of consecutive difference values 0 that exist at the last of the D[i] column (S79), and connects the switch 48 to "block buffer output" for the difference values up to the difference value D[M] that is the previous difference value of such consecutive difference values 0, and then connects the switch 48 to "end code holding unit output".

The variable length coding unit 49 codes the difference values D[i] inputted from the block buffer 45 via the switch 48 and the end code inputted from the end code holding unit 47 via the switch 48 (S82). Here, since the end code can take any value that cannot be taken by D[i], the end code here is −W[M], i.e., W[M]=0. This is because the value satisfying "W[M]=0" can be identified as the end code since the frequency components of the quantization matrix are positive.

FIGS. 8A to 8C are diagrams, each showing an example of variable length coding performed by the variable length coding unit 49. Exponential Golomb codes are used in these examples.

FIG. 8A shows a first example of variable length codes. This drawing shows a relationship between code words (code) and difference values before being coded (value). This example is applicable to the case where difference values can take positive values. The larger the difference values, the less frequently they occur and the longer their code length becomes, whereas the smaller the difference values, the shorter the length of their code words becomes. Conversion from the value of each component into a code word can be easily carried out using an arithmetic expression shown in FIG. 8A. When the difference value is 7, for example, it is represented as 7=4+3 (2 raised to a power of 2+binary "11"). The code word for this difference value 7 is represented as a bit string consisting of "000 (three 0s)", "1", and "11". "N" in FIG. 8A denotes the closest exponential of 2 that does not exceed each difference value. "$X_0X_1X_2 \ldots X_{N-1}$" denotes a bit string indicating the value resulting from subtracting the closest exponential of 2 from each difference value.

FIG. 8B shows a second example of variable length coding. In this drawing, the value column describes the frequency components W[i] of the quantization matrix (i.e., predetermined value K+difference value). This example is applicable to the case where the value of each frequency component W[i] of a quantization matrix is most likely to take the predetermined value K. Since the occurrence frequency of the predetermined value K is high, the code length becomes shortest when the value of a frequency component is K, with the code length becoming longer as the value of a frequency component is distant from K. The predetermined value K may be W[i−1], for example, or another previously determined constant.

FIG. 8C shows a third example of variable length codes. This drawing shows a relationship between code words (code) and difference values before being coded (value). This example is applicable to the case where difference values can take not only positive values but also negative values. When each component of a quantization matrix is coded in order shown in one of FIGS. 5A to 5D, the values of neighboring frequency components W[i−1] are strongly correlated. Thus, by coding a difference value between the previously coded component value W[i−1] and the current component value W[i] in order shown in one of FIGS. 5A to 5D, the resulting difference values center around 0. Thus, it becomes possible to further reduce the number of variable length code bits by assigning code words with shorter code length to values around 0 and assigning code words with longer code length to values distant from 0, as FIG. 8C shows.

Figure 1:
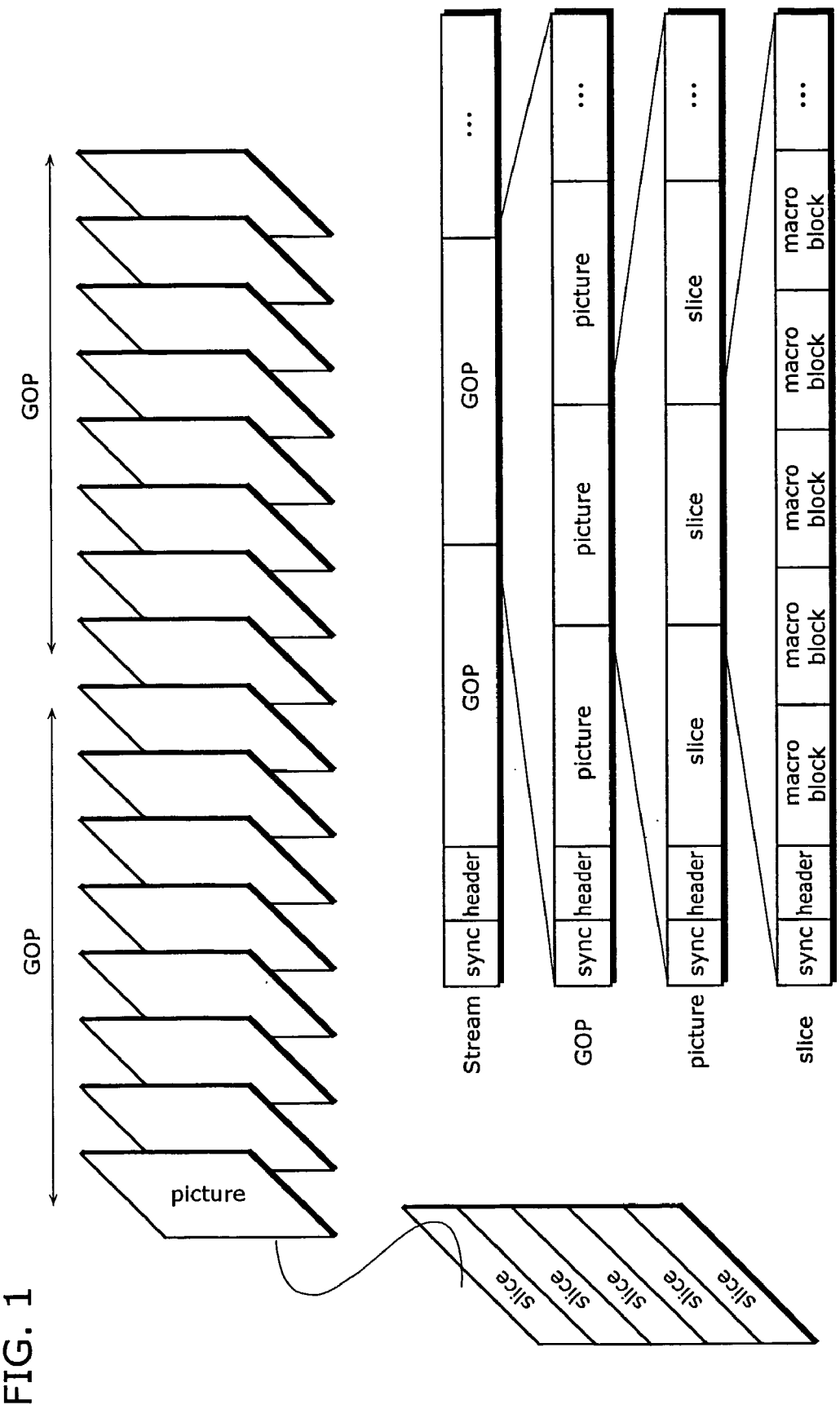
FIG. 1 is a diagram illustrating an example data structure of a bitstream.

FIGS. 9A to 9C are diagrams showing a quantization matrix and the data structure of the quantization matrix coded in a stream. In FIGS. 9B and 9C, "Header" is equivalent to the header of a stream/GOP/picture shown in FIG. 1. FIG. 9A is a diagram showing an arrangement of the frequency components of a quantization matrix. In this drawing, "Wi,j" denotes a component of the quantization matrix in the j-th row in the i-th line. FIGS. 9B and 9C illustrate how each data obtained by coding each component of the quantization matrix is arranged in the header. "WeightingMatrix" represents a bitstream obtained by coding the quantization matrix. FIG. 9B shows a stream obtained by performing coding in order shown in FIG. 5C, whereas FIG. 9C shows a stream obtained by performing coding in order shown in FIG. 5D. Note that "Wi, j" in the streams shown in FIGS. 9B and 9C indicates that this is a coded variable length code corresponding to Wi, j shown in FIG. 9A.

As described above, since the WM coding unit according to the present embodiment determines a difference value D[i] between a frequency component W[i] and a predetermined value K, the difference value D[i] takes a value smaller than the frequency component W[i]. Furthermore, since the WM coding unit does not code a frequency component W[i] itself but each difference value D[i], it becomes possible to shorten the code length of each variable length code and therefore to improve coding efficiency.

Moreover, the use of the previous frequency component W[i−1] as a predetermined value K makes it possible for each difference value D[i] to take a further smaller value, as a result of which coding efficiency is further improved. This is because there is usually a correlation between each frequency component W[i] and the previous frequency component W[i−1].

What is more, since frequency components W[i] are coded in order from the lower frequencies to the higher frequencies, it is highly probable that each frequency component W[i] and the previous frequency component W[i−1] take similar values. Therefore, it becomes possible for each difference value D[i] to take a further smaller value in a more reliable manner, as a result of which coding efficiency is further improved.

Furthermore, in the case where each difference value D[i] is represented as a remainder that results from dividing each difference value by 2 raised to a power of k (k=8), it becomes possible for them to take small values that can be represented virtually by 8 bits and therefore to further reduce the number of variable length code bits.

Moreover, in the case where there are consecutive frequency components with the same value at the last of a quantization matrix, no variable length code is generated for such plurality of frequency components, rather than generating a plurality of variable length codes with the same bit string. Accordingly, it becomes possible to further improve coding efficiency. In this case, by adding an end code, it becomes also possible to improve the efficiency of decoding performed by a picture decoding apparatus.

Figure 10:
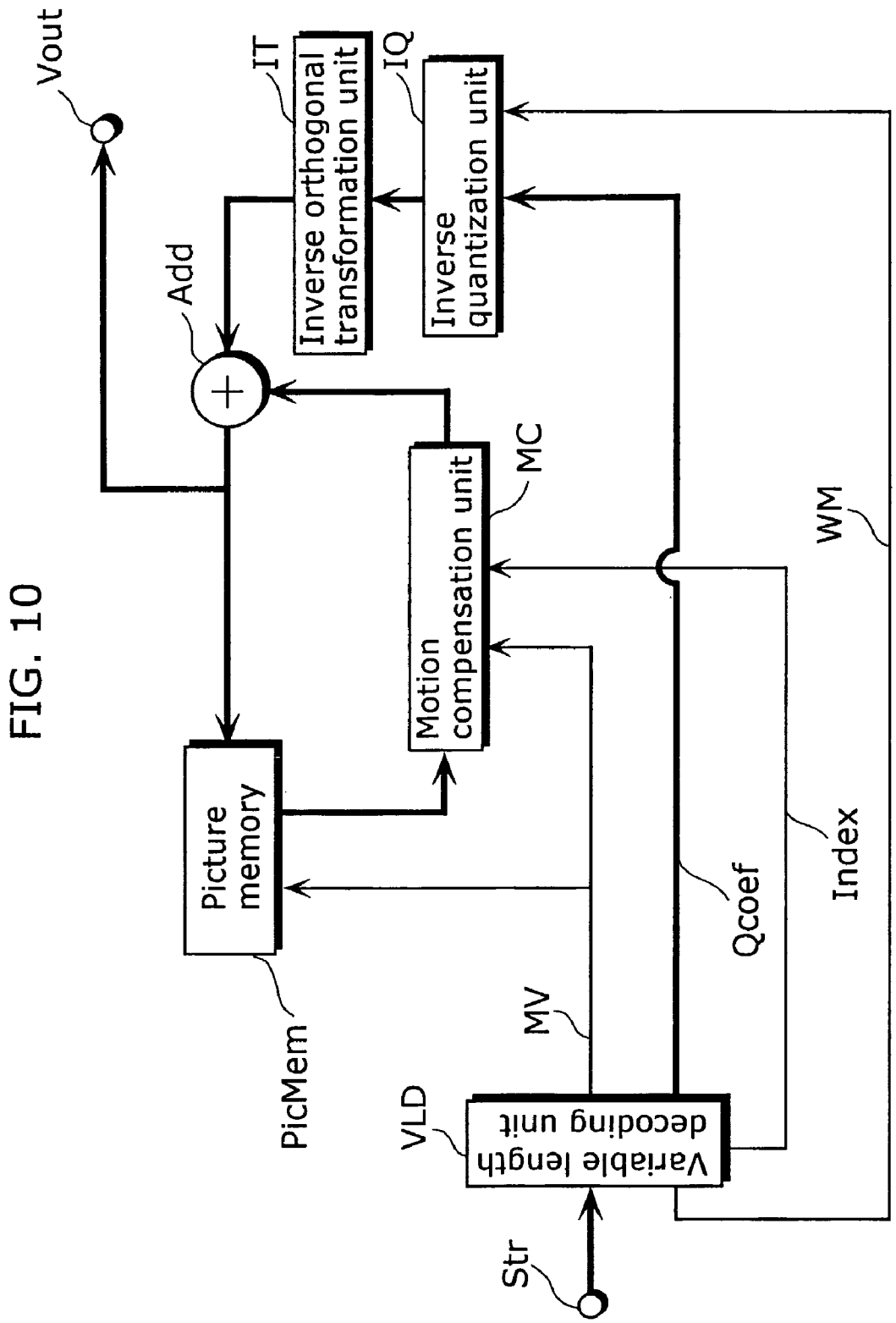
FIG. 10 is a block diagram showing a construction of a picture decoding apparatus.

FIG. 10 is a block diagram showing the construction of a picture decoding apparatus according to the first embodiment of the present invention. In this drawing, units that operate in the same manner as that of the units in the picture coding apparatus shown in FIG. 3 are assigned the same numbers, and descriptions thereof are omitted.

The variable length decoding unit VLD decodes the coded stream Str into the quantization matrices WM, quantized values Qcoef, reference indices Index, and motion vectors MV. In order to do this, the variable length decoding unit VLD includes a first decoding unit and a second decoding unit. The first decoding unit (hereinafter referred to as "WM decoding unit") performs variable length decoding on each coded quantization matrix WM, whereas the second decoding unit performs variable length decoding on information other than the coded quantization matrices WM, i.e., each of the coded quantized values Qcoef, reference indices Index, and motion vectors MV. The WM decoding unit determines the frequency components of each quantization matrix by variable-length decoding the variable-length-coded quantization matrix into difference values of the respective frequency components and then by adding each resulting difference value to a predetermined value corresponding to its frequency component.

Decoding is performed on each of the quantization matrices QM, quantized values Qcoef, reference indices Index, and motion vectors MV through the picture memory PicMem, the motion compensation unit MC, and the inverse quantization unit IQ. This decoding is already described above with reference to the block diagram of the picture coding apparatus shown in FIG. 3.

Figure 11:
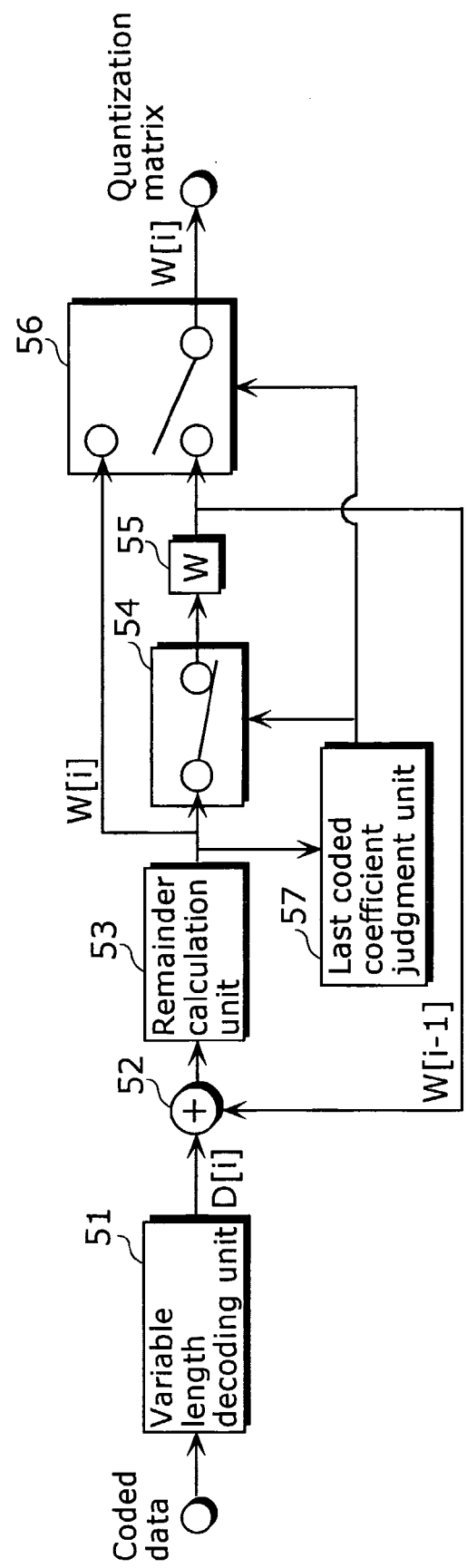
FIG. 11 is a block diagram showing a construction of a WM decoding unit.

FIG. 11 is a block diagram showing the construction of the WM decoding unit. As this drawing shows, the WM decoding unit is comprised of a variable length decoding unit 51, an addition unit 52, a remainder calculation unit 53, a switch 54, a W buffer 55, a switch 56, and an end coefficient judgment unit 57.

The variable length decoding unit 51 decodes the variable length code of each of the variable-length coded frequency components into a difference value D[i].

The addition unit 52 adds each difference value D[i] from the variable length decoding unit 51 to the value of the previous frequency component W[i−1] from the W buffer 55.

The remainder calculation unit 53 determines each frequency component W[i] by adding each addition result of the addition unit 52 to 2 raised to a power of k, and then by dividing the resulting value by 2 raised to a power of k to calculate a remainder. More specifically, the remainder calculation unit 53 carries out (D[i]+W[i−1]+256)% 256. Here, "%" denotes an operation for determining a remainder obtained by dividing the resulting value by 256.

The switch 54 turns on while no end code is outputted from the remainder calculation unit 53 and turns off after an end code is outputted.

The W buffer 55 holds a frequency component W[i] inputted from the remainder calculation unit 53 via the switch 54 and outputs it to the addition unit 52 in the next cycle as a frequency component W[i−1]. The W buffer 55 further holds W[i−1] (e.g., 8) as an initial value.

The switch 56 keeps selecting a frequency component W[i] inputted from the remainder calculation unit 53 via the switch 54 while no end code is outputted from the remainder calculation unit 53, whereas selecting the W buffer 55 after an end code is outputted.

The end coefficient judgment unit 57 judges whether an end code has been outputted from the remainder calculation unit 53 and controls the switch 54 and the switch 56 based on such judgment.

As described above, it is possible to decode W[i] corresponding to all the frequency components. Note that even when no end code is detected, decoding of the quantization matrix is terminated at the completion of the decoding of difference values D[i] that are equivalent in number to the number of all the frequency components included in the block.

Figure 12:
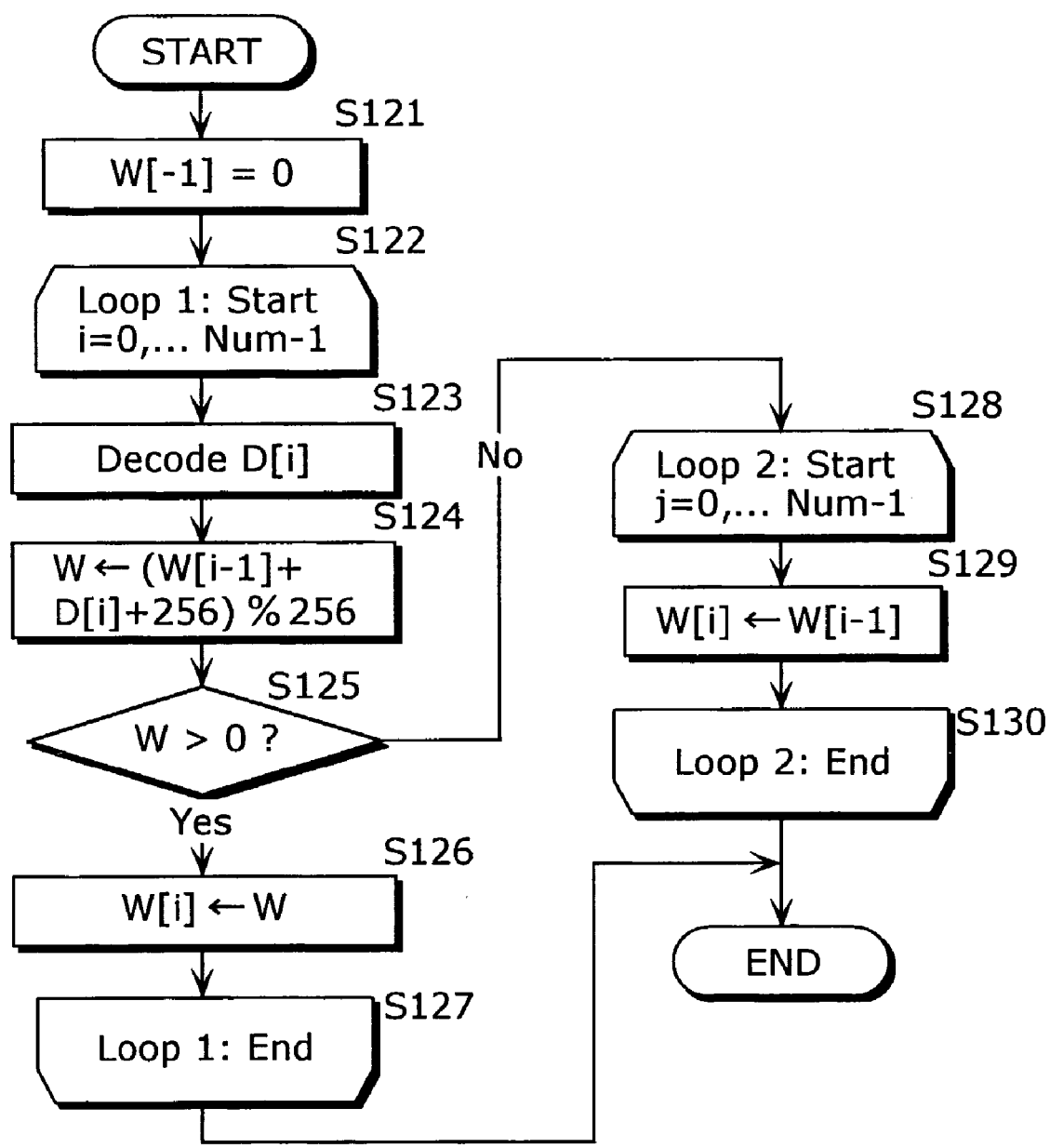
FIG. 12 is a flowchart showing processing performed by the WM decoding unit.

FIG. 12 is a flowchart showing processing performed by the WM decoding unit. In this flowchart, "Num" denotes the number of frequency components (e.g., 16, 64) in the quantization matrix, whereas "i" denotes a variable used to count from 0 to (Num−1) and "j" denotes a variable used to count from "i" to (Num−1). As FIG. 12 shows, the WM decoding unit first causes the W buffer 55 to hold the initial value W[i−1] (S121), performs variable length decoding and outputs the resulting codes through processes shown as a loop 1 (S122 to S127), and outputs consecutive frequency coefficients with the same value through processes shown as a loop 2 (S128 to S130) after an end code is detected.

In the loop 1, the variable length decoding unit 51 decodes an inputted variable length code into a difference value D[i] (S123). Then, the addition unit 52 adds the difference value from the variable length decoding unit 51 to the previous frequency component from the W buffer 55, and the remainder calculation unit 53 carries out a calculation so that a remainder W satisfies the following (S124): W=(D[i]+W[i−1]+256)% 256. The end coefficient judgment unit 57 judges whether this remainder W is an end code or not (here, whether the remainder W is positive or negative) (S125). When the end coefficient judgment unit 57 judges that the remainder W is not an end code, such remainder W is outputted as a frequency component W[i−1] from the remainder calculation unit 53 via the switch, and is stored into the W buffer 55 via the switch 54 at the same time (S126). Meanwhile, when the end coefficient judgment unit 57 judges that the remainder W is an end code, the processes of the loop 2 are then carried out.

In the loop 2, when there are consecutive frequency components with the same value at the last of the quantization matrix, frequency components W[i−1] are consecutively outputted as frequency components W[i]. More specifically, frequency components W[i−1] held in the W buffer 55 are outputted via the switch 56 as the subsequent frequency components W[i] to W[Num−1] (S129).

As described above, the WM decoding unit according to the present embodiment correctly decodes variable length codes that have been differential coded by the WM coding unit. Furthermore, when there are consecutive frequency components with the same value at the last of a quantization matrix, the WM decoding unit is required to decode only one variable length code to obtain all of such plurality of frequency components. In this case, an end code makes it possible to easily judge that there are consecutive frequency components with the same value at the last of a quantization matrix.

Furthermore, if a program for realizing the picture coding method and the picture decoding method as shown in the aforementioned embodiment are recorded on a recording medium such as a flexible disk, it becomes possible to easily perform the processing presented in the above embodiment in an independent computer system.

Figure 13A:
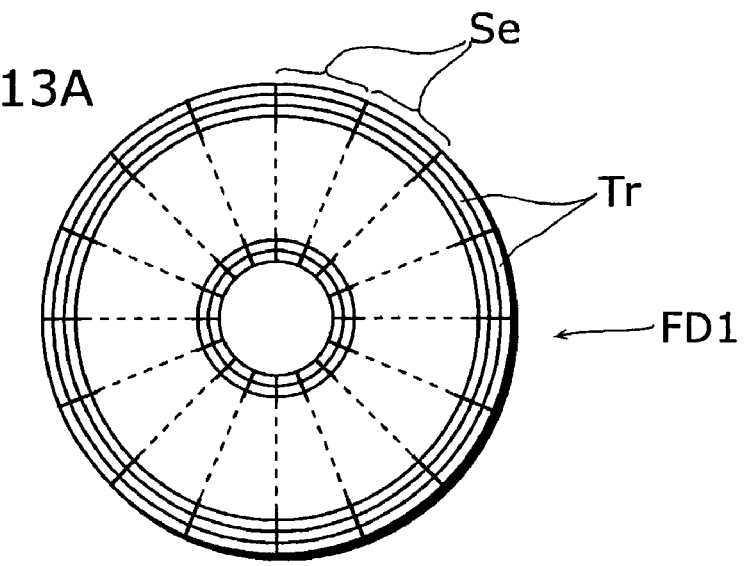
FIGS. 13A to 13C are diagrams illustrating a recording medium that stores a program for realizing, by a computer system, the picture coding method and the picture decoding method according to the above embodiment.
Figure 13B:
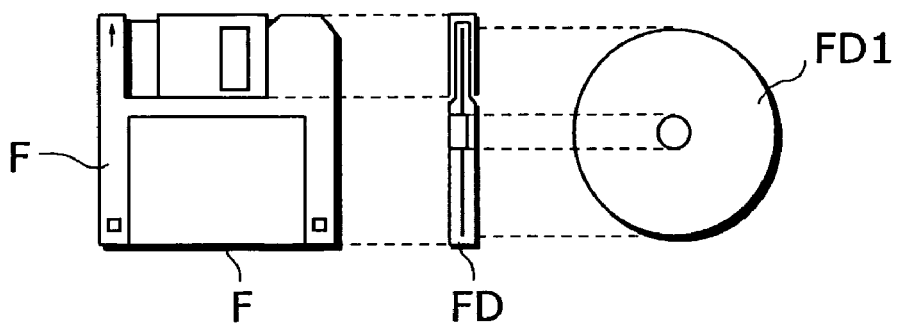
Figure 13C:
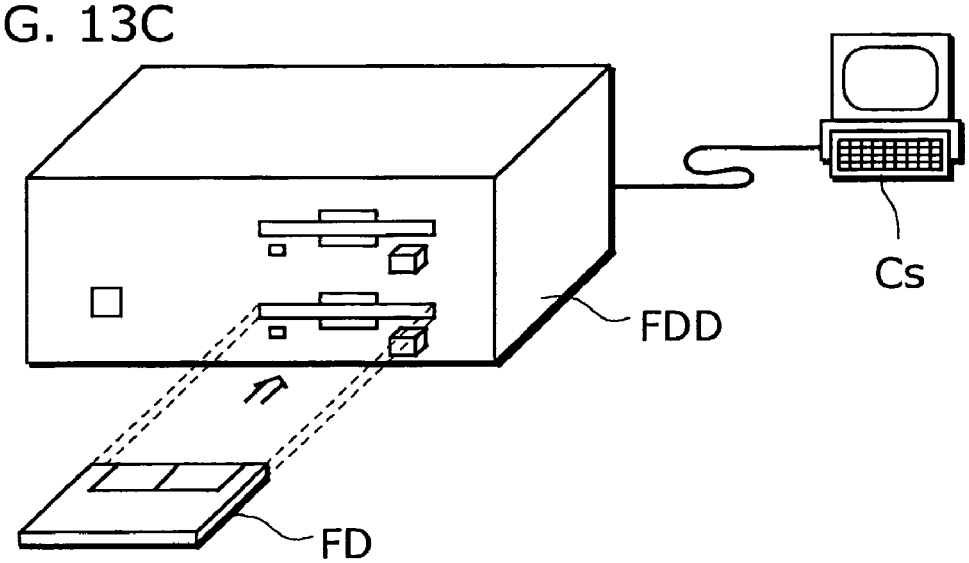

FIGS. 13A, 13B, and 13C are diagrams illustrating a recording medium that stores a program for realizing the picture coding method and the picture decoding method according to the aforementioned embodiment.

FIG. 13B shows an external view of a flexible disk viewed from the front, its schematic cross-sectional view, and the flexible disk itself, while FIG. 13A illustrates an example physical format of the flexible disk as a recording medium itself. The flexible disk FD is contained in a case F, and a plurality of tracks Tr are formed concentrically on the surface of the flexible disk FD in the radius direction from the periphery, each track being divided into 16 sectors Se in the angular direction. Therefore, in the flexible disk storing the above-mentioned program, the picture coding method and the picture decoding method as such program is recorded in an area allocated for it on the flexible disk FD.

Meanwhile, FIG. 13C shows the structure required for recording and reading out the program on and from the flexible disk FD. When the program realizing the above picture coding method and picture decoding method is to be recorded onto the flexible disk FD, such program shall be written by the use of the computer system Cs via a flexible disk drive FDD. Meanwhile, when the picture coding method and the picture decoding method are to be constructed in the computer system Cs through the program on the flexible disk FD, the program shall be read out from the flexible disk FD via the flexible disk drive FDD and then transferred to the computer system Cs.

The above description is given on the assumption that a recording medium is a flexible disk, but an optical disc may also be used. In addition, the recording medium is not limited to this, and any other medium such as an IC card and a ROM cassette capable of recording a program can also be used as a non-transitory recording medium.

The following describes application examples of the picture coding method and picture decoding method as shown in the above embodiment as well as a system using them.

Figure 14:
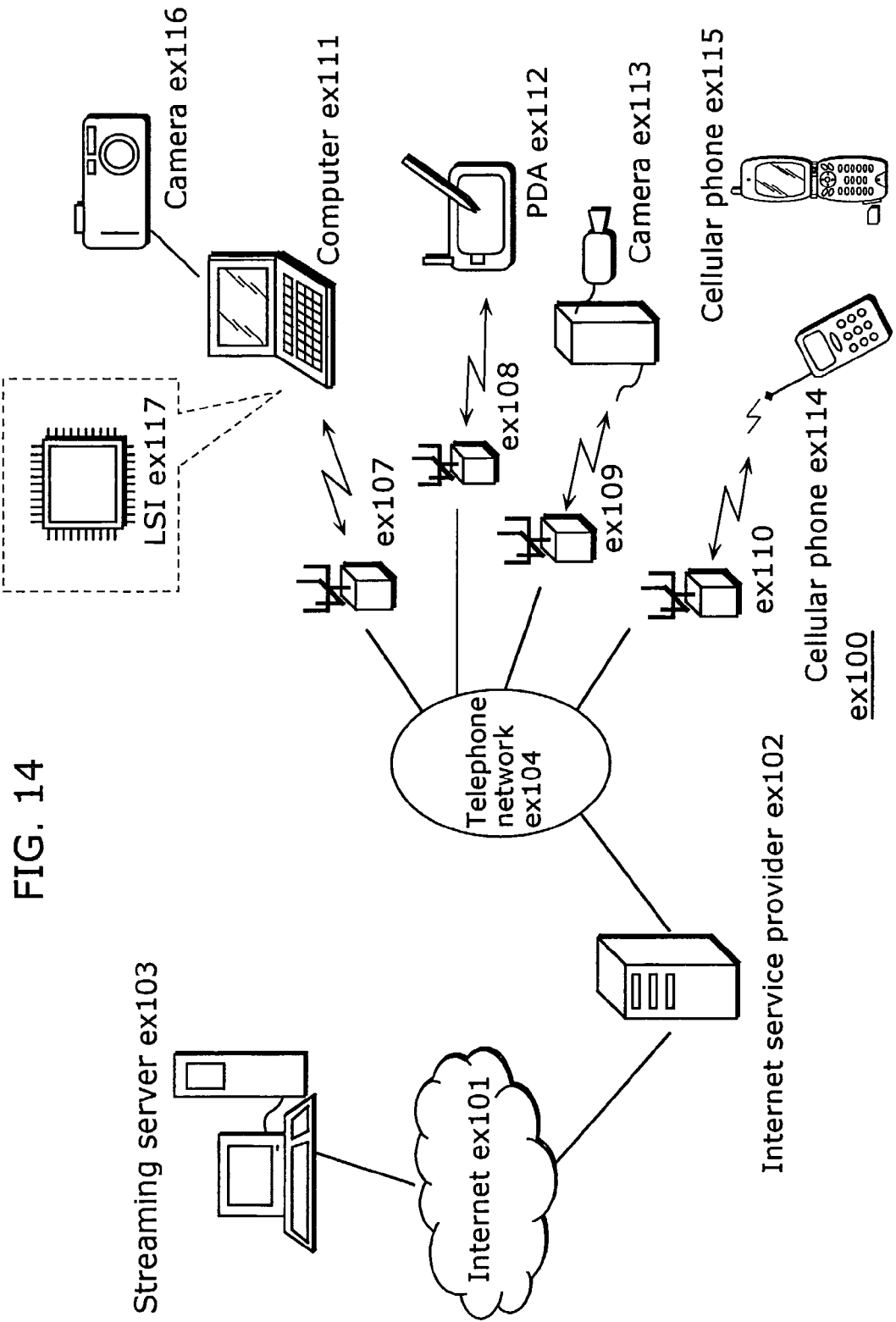
FIG. 14 is a block diagram showing an overall configuration of a content supply system.

FIG. 14 is a block diagram showing an overall configuration of a content supply system ex100 that realizes a content distribution service. The area for providing a communication service is divided into cells of desired size, and base stations ex107~ex110, which are fixed wireless stations, are placed in the respective cells.

In this content supply system ex100, devices such as a computer ex111, a PDA (Personal Digital Assistant) ex112, a camera ex113, a cellular phone ex114, and a camera-equipped cellular phone ex115 are respectively connected to the Internet ex101 via an Internet service provider ex102, a telephone network ex104, and the base stations ex107~ex110.

However, the content supply system ex100 is not limited to the combination as shown in FIG. 14, and may be connected to a combination of any of them. Also, each of the devices may be connected directly to the telephone network ex104, not via the base stations ex107~ex110, which are fixed wireless stations.

The camera ex113 is a device such as a digital video camera capable of shooting moving pictures. The cellular phone may be a cellular phone of a PDC (Personal Digital Communication) system, a CDMA (Code Division Multiple Access) system, a W-CDMA (Wideband-Code Division Multiple Access) system or a GSM (Global System for Mobile Communications) system, a PHS (Personal Handyphone system) or the like, and may be any one of these.

Furthermore, a streaming server ex103 is connected to the camera ex113 via the base station ex109 and the telephone network ex104, which enables live distribution or the like based on coded data transmitted by the user using the camera ex113. Either the camera ex113 or a server and the like capable of data transmission processing may code the shot data. Also, moving picture data shot by a camera ex116 may be transmitted to the streaming server ex103 via the computer ex111. The camera ex116 is a device such as a digital camera capable of shooting still pictures and moving pictures. In this case, either the camera ex116 or the computer ex111 may code the moving picture data. In this case, an LSI ex117 included in the computer ex111 or the camera ex116 performs coding processing. Note that software for coding and decoding may be integrated into a certain type of storage medium (such as a CD-ROM, a flexible disk and a hard disk) that is a recording medium readable by the computer ex111 and the like. Furthermore, the camera-equipped cellular phone ex115 may transmit the moving picture data. This moving picture data is data coded by an LSI included in the cellular phone ex115.

In this content supply system ex100, content (e.g. a music live video) which has been shot by the user using the camera ex113, the camera ex116 or the like is coded in the same manner as the above-described embodiment and transmitted to the streaming server ex103, and the streaming server ex103 makes stream distribution of the content data to clients at their request. The clients here include the computer ex111, the PDA ex112, the camera ex113, the cellular phone ex114 and so forth capable of decoding the above coded data. The content supply system ex100 with the above configuration is a system that enables the clients to receive and reproduce the coded data and realizes personal broadcasting by allowing them to receive, decode and reproduce the data in real time.

The picture coding apparatus and picture decoding apparatus presented in the above embodiment can be used for coding and decoding to be performed in each of the devices making up the above system.

An explanation is given of a cellular phone as an example.

Figure 15:
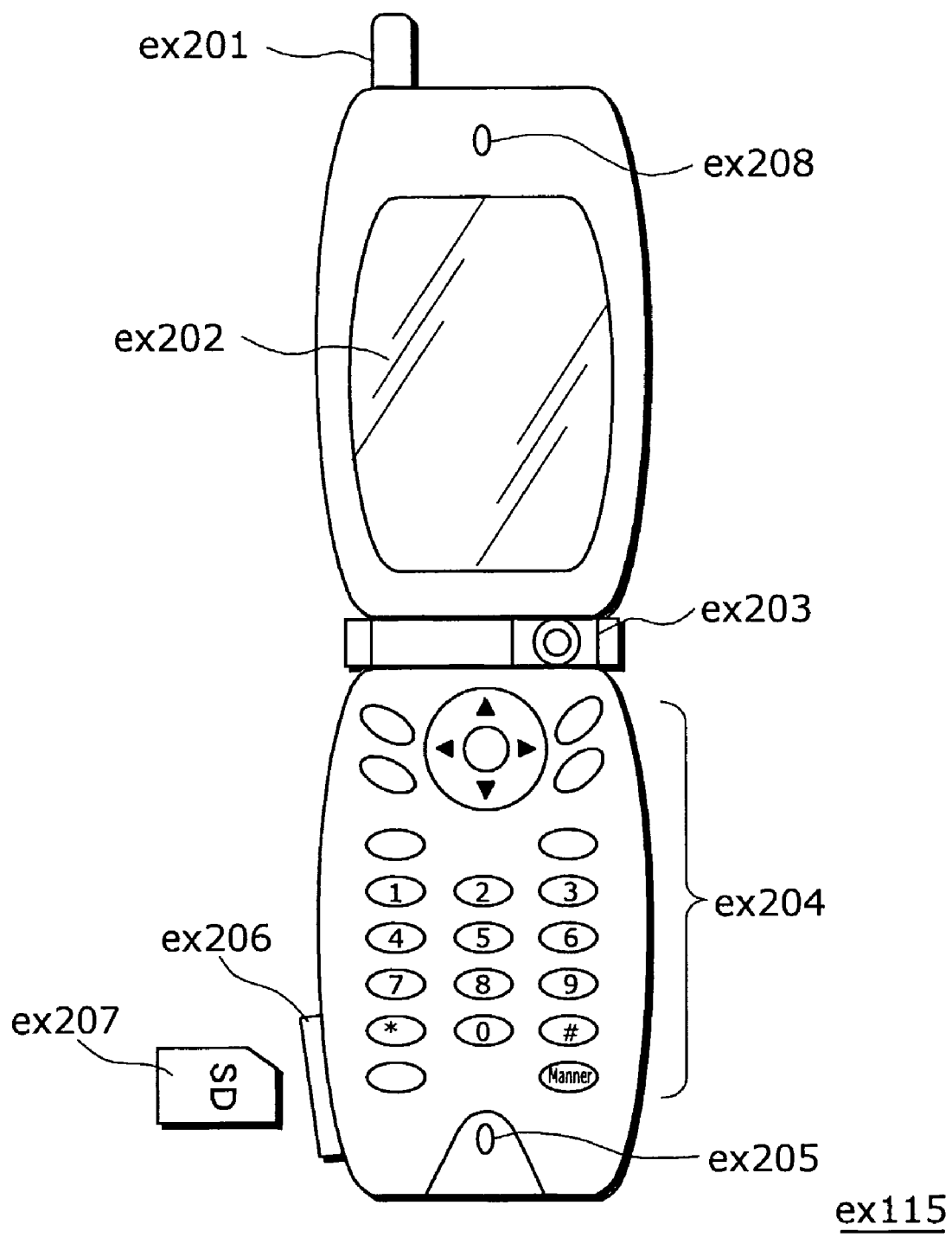
FIG. 15 is a diagram showing an external view of a cellular phone that employs the picture coding method and the picture decoding method.

FIG. 15 is a diagram showing the cellular phone ex115 that employs the picture coding method and the picture decoding method explained in the above embodiment. The cellular phone ex115 has an antenna ex201 for transmitting/receiving radio waves to and from the base station ex110, a camera unit ex203 such as a CCD camera capable of shooting video and still pictures, a display unit ex202 such as a liquid crystal display for displaying the data obtained by decoding video and the like shot by the camera unit ex203 and video and the like received by the antenna ex201, a main body equipped with a group of operation keys ex204, a voice output unit ex208 such as a speaker for outputting voices, a voice input unit ex205 such as a microphone for inputting voices, a recording medium ex207 for storing coded data or decoded data such as data of moving pictures or still pictures shot by the camera, data of received e-mails and moving picture data or still picture data, and a slot unit ex206 for enabling the recording medium ex207 to be attached to the cellular phone ex115. The recording medium ex207 is embodied as a flash memory element, a kind of EEPROM (Electrically Erasable and Programmable Read Only Memory) that is an electrically erasable and rewritable nonvolatile memory, stored in a plastic case such as an SD card.

Figure 16:
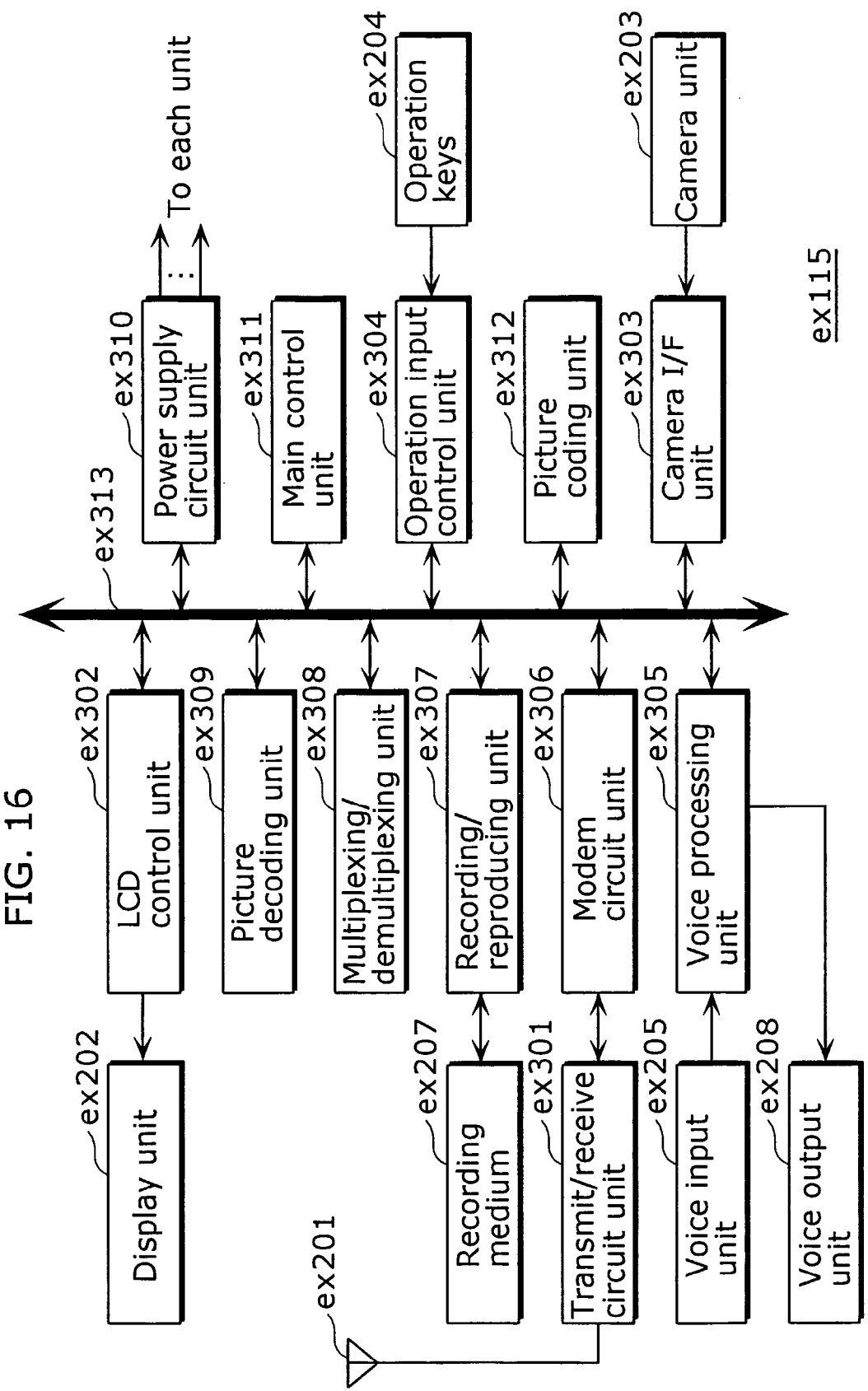
FIG. 16 is a block diagram showing a construction of the cellular phone.

Next, referring to FIG. 16, a description is given of the cellular phone ex115. In the cellular phone ex115, a main control unit ex311 for centrally controlling the display unit ex202 and each unit of the main body having the operation keys ex204 is configured in a manner in which a power supply circuit unit ex310, an operation input control unit ex304, a picture coding unit ex312, a camera interface unit ex303, an LCD (Liquid Crystal Display) control unit ex302, a picture decoding unit ex309, a multiplexing/demultiplexing unit ex308, a recording/reproducing unit ex307, a modem circuit unit ex306, and a voice processing unit ex305 are interconnected via a synchronous bus ex313.

When a call-end key or a power key is turned on by a user operation, the power supply circuit unit ex310 supplies each unit with power from a battery pack, and activates the camera-equipped digital cellular phone ex115 to make it into a ready state.

In the cellular phone ex115, the voice processing unit ex305 converts a voice signal received by the voice input unit ex205 in conversation mode into digital voice data under the control of the main control unit ex311 comprised of a CPU, a ROM, a RAM and others, the modem circuit unit ex306 performs spread spectrum processing on it, and a transmit/receive circuit unit ex301 performs digital-to-analog conversion processing and frequency transformation processing on the data, so as to transmit the resultant via the antenna ex201. Also, in the cellular phone ex115, data received by the antenna ex201 in conversation mode is amplified and performed of frequency transformation processing and analog-to-digital conversion processing, the modem circuit unit ex306 performs inverse spread spectrum processing on the resultant, and the voice processing unit ex305 converts it into analog voice data, so as to output it via the voice output unit ex208.

Furthermore, when sending an e-mail in data communication mode, text data of the e-mail inputted by operating the operation keys ex204 on the main body is sent out to the main control unit ex311 via the operation input control unit ex304. In the main control unit ex311, after the modem circuit unit ex306 performs spread spectrum processing on the text data and the transmit/receive circuit unit ex301 performs digital-to-analog conversion processing and frequency transformation processing on it, the resultant is transmitted to the base station ex110 via the antenna ex201.

When picture data is transmitted in data communication mode, the picture data shot by the camera unit ex203 is supplied to the picture coding unit ex312 via the camera interface unit ex303. When picture data is not to be transmitted, it is also possible to display such picture data shot by the camera unit ex203 directly on the display unit ex202 via the camera interface unit ex303 and the LCD control unit ex302.

The picture coding unit ex312, which includes the picture coding apparatus according to the present invention, performs compression coding on the picture data supplied from the camera unit ex203 using the coding method employed by the picture coding apparatus presented in the above embodiment, so as to convert it into coded picture data, and sends it out to the multiplexing/demultiplexing unit ex308. At this time, the cellular phone ex115 sends voices received by the voice input unit ex205 while the shooting by the camera unit ex203 is taking place, to the multiplexing/demultiplexing unit ex308 as digital voice data via the voice processing unit ex305.

The multiplexing/demultiplexing unit ex308 multiplexes the coded picture data supplied from the picture coding unit ex312 and the voice data supplied from the voice processing unit ex305 using a predetermined method, the modem circuit unit ex306 performs spread spectrum processing on the resulting multiplexed data, and the transmit/receive circuit unit ex301 performs digital-to-analog conversion processing and frequency transformation processing on the resultant, so as to transmit the processed data via the antenna ex201.

When receiving, in data communication mode, moving picture file data which is linked to a Web page or the like, the modem circuit unit ex306 performs inverse spread spectrum processing on the received signal received from the base station ex110 via the antenna ex201, and sends out the resulting multiplexed data to the multiplexing/demultiplexing unit ex308.

In order to decode the multiplexed data received via the antenna ex201, the multiplexing/demultiplexing unit ex308 separates the multiplexed data into a coded bitstream of picture data and a coded bitstream of voice data, and supplies such coded picture data to the picture decoding unit ex309 and such voice data to the voice processing unit ex305 via the synchronous bus ex313.

Next, the picture decoding unit ex309, which includes the picture decoding apparatus according to the present invention, decodes the coded bitstream of the picture data using the decoding method paired with the coding method shown in the above-mentioned embodiment so as to generate moving picture data for reproduction, and supplies such data to the display unit ex202 via the LCD control unit ex302. Accordingly, moving picture data included in the moving picture file linked to a Web page, for instance, is displayed. At the same time, the voice processing unit ex305 converts the voice data into an analog voice signal, and then supplies this to the voice output unit ex208. Accordingly, voice data included in the moving picture file linked to a Web page, for instance, is reproduced.

Figure 17:
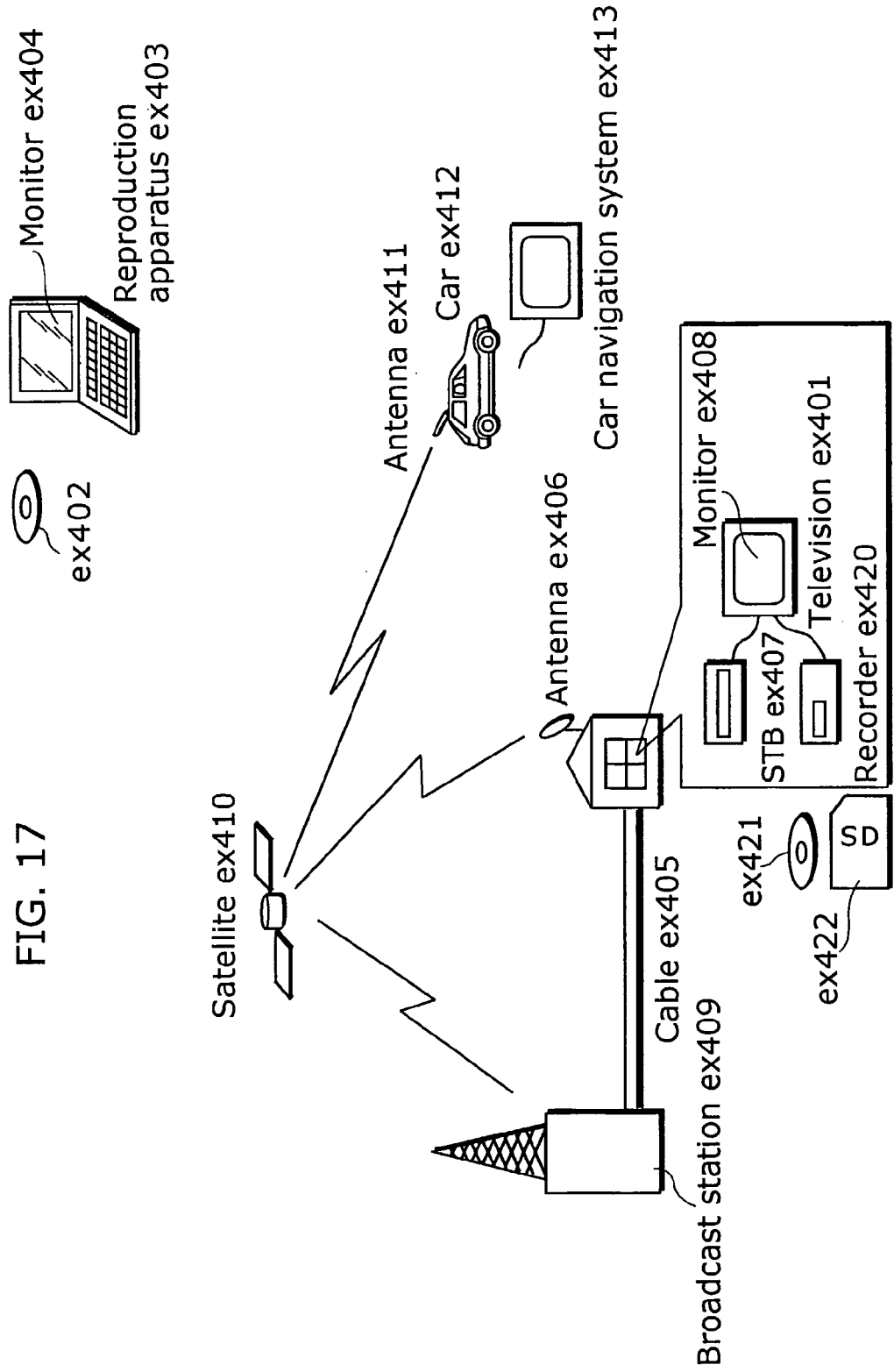
FIG. 17 is a diagram showing an overall configuration of a digital broadcasting system.

Note that the aforementioned system is not an exclusive example and therefore that at least either the picture coding apparatus or the picture decoding apparatus of the above embodiment can be incorporated into a digital broadcasting system as shown in FIG. 17, against the backdrop that satellite/terrestrial digital broadcasting has been a recent topic of conversation. To be more specific, at a broadcasting station ex409, a coded bitstream of video information is transmitted, by radio waves, to a satellite ex410 for communications or broadcasting. Upon receipt of it, the broadcast satellite ex410 transmits radio waves for broadcasting, an antenna ex406 of a house equipped with satellite broadcasting reception facilities receives such radio waves, and an apparatus such as a television (receiver) ex401 and a set top box (STP) ex407 decodes the coded bitstream and reproduces the decoded data. The picture decoding apparatus as shown in the above-mentioned embodiment can be implemented in the reproduction apparatus ex403 for reading and decoding the coded bitstream recorded on a storage medium ex402 that is a recording medium such as a CD and a DVD. In this case, a reproduced video signal is displayed on a monitor ex404. It is also conceivable that the picture decoding apparatus is implemented in the set top box ex407 connected to a cable ex405 for cable television or the antenna ex406 for satellite/terrestrial broadcasting so as to reproduce it on a television monitor ex408. In this case, the picture decoding apparatus may be incorporated into the television, not in the set top box. Or, a car ex412 with an antenna ex411 can receive a signal from the satellite ex410, the base station ex107 or the like, so as to reproduce a moving picture on a display device such as a car navigation system ex413 mounted on the car ex412.

Furthermore, it is also possible to code a picture signal by the picture coding apparatus presented in the above embodiment and to record the resultant in a recording medium. Examples include a DVD recorder for recording a picture signal on a DVD disc ex421 and a recorder ex420 such as a disc recorder for recording a picture signal on a hard disk. Moreover, a picture signal can also be recorded in an SD card ex422. If the recorder ex420 is equipped with the picture decoding apparatus presented in the above embodiment, it is possible to reproduce a picture signal recorded on the DVD disc ex421 or in the SD card ex422, and display it on the monitor ex408.

As the configuration of the car navigation system ex413, the configuration without the camera unit ex203 and the camera interface unit ex303, out of the configuration shown in FIG. 16, is conceivable. The same is applicable to the computer ex111, the television (receiver) ex401 and the like.

Concerning the terminals such as the cellular phone ex114, a transmitting/receiving terminal having both an encoder and a decoder, as well as a transmitting terminal only with an encoder, and a receiving terminal only with a decoder are possible as forms of implementation.

Note that each function block in the block diagram shown in FIGS. 3, 4, 10, and 11 can be realized as an LSI that is an integrated circuit apparatus. Such LSI may be incorporated in one or plural chip form (e.g. function blocks other than a memory may be incorporated into a single chip). Here, LSI is taken as an example, but, it can be called "IC", "system LSI", "super LSI" and "ultra LSI" depending on the integration degree.

The method for incorporation into an integrated circuit is not limited to the LSI, and it may be realized with a private line or a general processor. After manufacturing of LSI, a Field Programmable Gate Array (FPGA) that is programmable or a reconfigurable processor that can reconfigure the connection and settings for the circuit cell in the LSI may be utilized.

Furthermore, along with the arrival of technique for incorporation into an integrated circuit that replaces the LSI owing to a progress in semiconductor technology or another technique that has deviated from it, integration of the function blocks may be carried out using the newly-arrived technology. Bio-technology may be cited as one of the examples.

Among the function blocks, only a unit for storing data may be constructed separately without being incorporated in a chip form, as the storage medium 115 described in the present embodiment.

Note that the main part in the function blocks shown in FIGS. 3, 4, 10, and 11 or in the flowcharts shown in FIGS. 7 and to 12 can be realized by a processor or a program.

As stated above, it is possible to employ the picture coding method and the picture decoding method presented in the above embodiment into any one of the above-described devices and systems. Accordingly, it becomes possible to achieve an effect described in the aforementioned embodiment.

Second Embodiment

The following describes the second embodiment of the present invention.

The present invention is directed to enabling quantization of matrices to be carried out and represented in a video coding system that contains intra-prediction and more particularly creating a series of cyclic difference values suitable for signed Exp-Golomb codes.

The prior art is aware of quantization matrix for video coding and the applicability of Exp-Golomb codes. Video code has also been represented in hierarchical syntactic structure with associated semantics and has used both lossy and non-lossy or Variable Length Coding in video compression. Transform domain quantization has also been known and used.

The present invention describes a method and program for representing, carrying and enabling video compression by using quantization weighting matrices and addresses the following features:

1. Enable quantization matrices to be carried and represented in a video coding system that contains intra-prediction.

2. Define and carry quantization weighting matrices that can be implemented by integer based and division free computation.

3. Enable quantization matrix to be encoded in an efficient Cyclic Differential code and Exp-Golomb code.

4. Support quantization matrix representation that allows redundant weighting values to be derived at decoder side rather than being carried over communication transport data.

0. Introduction of Differential Coding for Quantization Matrix

To code quantization matrix entries, the matrix entries are first mapped to a one dimensional series. The mapping uses zigzag pattern as described in MPEG-4 Part 10 (similarly defined in MPEG-2 and MPEG-4 Part 2). An example of the zigzag pattern is given in FIG. 5A or 5B. The converted one dimensional series has 64 elements for 8×8 quantization matrix and 16 elements for 4×4 quantization matrix. For a quantization matrix defined, the elements are positive integer based with the range from 1 to 255, inclusive.

In current differential coding, we generate a differential code by subtracting the 1-d series element by the value of the previous element, with the exception that the first element in the series is subtracted by 8 (because the value for the first element is a weight for DC and is usually around 8). Then the differential codes are further coded using Exp-Golomb code, as described in MPEG-4 Part 10. (ISO/IEC JTC1/SC29WG11, 14496-10)

The current differential coding method of a quantization matrix has the following two problems:

1. The difference between the current and the previous values of a Q-matrix can have a value anyway between [−254, +254]. The spread of this range makes variable length coding using Exp-Golomb inefficient.

2. When a "truncating" approach is used to limit the number of matrix values to be coded, the special value to signal the end of the series of the data has to be reasonably sized. Otherwise it may make truncating approach inappropriate.

The solution here creates a series of cyclic difference values, so that the range of the differences are all within the range of [−128, +128], therefore making it more suitable for signed Exp-Golomb codes. This also mitigates the problem in signaling the end of the code series when the "truncation" approach is used.

Further toward an appropriate mechanism to signal the end of code series using the "truncation" approach, we refine here, so that the number of bits to be transmitted for signaling the end is equal or less than 9-bits. This can be achieved by using multiple signals to stop the series. This should be usable for code series of 64 codes long and maybe even usable for 16 also.

1. Inverse Process of Cyclic Differential Coding

Input of the process is D[i], the differential code.

Output of the process is W[i], the sequence of Quantization Matrix values sampled along the zigzag path.

The following operation is performed on the input W[i].

```
Define: M=16, for 4×4 block; M=64, for 8×8 block
Define M=16, for 4×4 matrix or M=64, for 8×8 matrix
W[0] = (D[0] + 8+256)%256
k=0;
for(i=1; (i<M)&&(W[i-1] + D[i] +256) % 256>0;i++)
{
    W[i] = (W[i-1] + D[i] +256)%256
}
for(j =I;j<M;j++){
    W[j] = W[i-1]
}
```

2. Differential Code Generation Process

Input of the process is W[i], the sequence of Quantization Matrix values sampled along the zigzag path.

Output of the process is D[i], the differential code generated from W[i].

The following operation is performed on the input W[i].

```
Define M=16, for 4×4 matrix or M=64, for 8×8 matrix
D[0] =W[0]−8
k=M;
for(i=1; i<M; i++)
{
        D[i] = W[i] −W[i−1]
        if( D[i]>128)
            D[i] = D[i]−256
        else if (D[i]<−128)
            D[i] = D[i] +256
        else if(D[i]== 0) && (k== M)
            k=i
        else if(D[i]!=0)
            k=M
}
// This is to insert the ending signal D[k] corresponding to
W[k]=0
if(k!=M){
    if (W[k−1]>128)
        D[k] = 256−W[k−1]
    else
        D[k] = −W[k−1]
```

```
}
// This is only for optimization
if(Length_of_ExpGlomb_code (D[k]) > M−k−i ) {
    for(i=k; i<M; i++)
        D[k]=0
}
```

This will generate a series of differential codes, D[i], where the absolute values are always equal to or less than 128, including the value indicating the end of the differential code series. Therefore these codes are more suitable for signed Exp-Golomb coding.

3. Mechanism to Signal the End of a Differential Code Series

Instead of using a signal value of W or D as a sign of the end of the differential code series, we can use more than one code and the encoder can choose which one to send.

The following are allowed by encoder to signal the end of a code series, which the decoder also must be able to recognize.

Suppose the end of the series to be coded is at k, (i.e. W[k]=W[k−1]) for W[i], i=0, . . . , M, and M is 16 for 4×4 transform block and 64 for 8×8 block.

Set W[k]=0. This corresponds to a difference code D[k] and the absolute value of D[k] should be less or equal to 128.

Set D[k] to be any values above 255 or below −255, which will have a signed Exp-Golomb code with the first 9 bit equal to zero, 0000000001xxxxxxxxx. The encoder only needs to send the first 10 bits (can we only send 9 bit instead without sending "1"). After decoding, the decoder will get a value larger than 255 for signed Golomb code. If decoder can handle illegal Golomb code, then sending only 9 bit of 0s will be sufficient.

Corresponding to this, the decoder procedure can be written as the follows. (In the following pseudo-code, instead of checking D[k] is above +255 or below −255, simply checking if D[i] is in the correct range, if not, then assume it is the end of the code sequence. Since the checking maybe needed anyway, it saves two conditional operations.

```
Define: M=16, for 4×4 block; M=64, for 8×8 block
Define M=16, for 4×4 matrix or M=64, for 8×8 matrix
D[0] = (W[0] + 8+256)%256
k=0;
    for (i=1; (i<M) &&(Golombcode Legal) && (−129<D[i]<129)
    && (W[i−1] +256) % 256>0; i++)
        W[i] = (W[i−1] + D[i] +256)%256
    {
    for(j = i;j<M;j++){
        W[j] = W[i−1]
    }
```

4. Further Issues

Fixed length code combined with Exp-Golomb codes are sometimes used to improve efficiency.

Generating Cyclic difference 2 bit (or 4 bit) LSB using fixed length code 6 bit (or 4 bit) MSB using Exp-Golomb codes This should further reduce total number of bits.

Note that the above-described "1. Inverse process of cyclic differential coding" can be described as derivation process for quantization weighting matrices as below.

Input to this process is a sequence of Exp-Golomb coded quantization weighting matrix values.

Output of this process is two dimensional array of quantization weighting matrix values.

The decoding process is invoked to decode the sequence of Exp-Golomb coded quantization weighting values.

The decoded values, d(i), are used to derive the quantization weighting matrix entries W(i). The following process is used in deriving the quantization weighting matrix entries. In the following equation, M=64 for 8×8 quantization matrix and M=16 for 4×4 quantization weighting matrix.

W(0)=d(0)+8

If ((d(i)<128) && (d(i)>−128) && ((W(i−1)+d(i)+256)% 256!=0))

W(i)=(W(i−1)+d(i)+256)% 256, for 0≦i≦M

Otherwise

W(i)=W(k−1), for i=k, . . . <M, where D(k)>128 or D(k)<−128, or W(k)=0, and 0<i, k<M

[W[I] is not allowed to be zero]

Quantization weighting matrix W(i, j) is derived from W(i) using the inverse block scanning process. The 4×4 inverse scanning order is shown in FIG. 5A. The 8×8 inverse scanning process is done as shown in FIG. 5B.

Note that the above-described "1. Inverse process of cyclic differential coding" can also be described as below. In the following, "ScalingList" denotes quantization matrix WM, "lastScale" denotes W[i−1], and "delta_scaling" denotes D[i]:

```
scaling_list( scalingList, sizeOfScalingList,
useDefaultScalingMatrixFlag ) {
    lastScale = 8
    nextScale = 8
    for( j = 0; j < sizeOfScalingList; j++ ) {
        if( nextScale != 0 ) {
    delta_scale
    nextScale = ( lastScale + delta_scale + 256 ) % 256
    useDefaultScalingMatrixFlag = ( j == 0 && nextScale == 0 )
    }
    scalingList[ j ] = ( nextScale == 0 ) ? lastScale : nextScale
    lastScale = scalingList[ j ]
    }
}
```

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The present invention is suited for use as a coding apparatus for coding a picture and a decoding apparatus for decoding a picture, as well as a web server for distributing a moving picture, a network terminal for receiving such moving picture, a digital camera capable of recording and reproducing a moving picture, a camera-equipped cellular phone, a DVD recorder/player, a PDA, a personal computer, and the like.

The invention claimed is:

1. A method for decoding a coded quantization matrix with a picture decoding apparatus, said method comprising:

decoding a coded stream into a difference value ranging from −128 to +127;

adding together a value of an (I−1)th component in the quantization matrix, the difference value, and 256; and calculating a remainder by dividing the result of said adding by 2 raised to 8-th power to obtain the value of an I-th component.

2. The method for decoding a coded quantization matrix according to claim 1, wherein said decoding of the coded stream is finished when the obtained value of the I-th component is zero.

3. The method for decoding a coded quantization matrix according to claim 1, wherein the result of said adding is a positive value.

4. The method for decoding a coded quantization matrix according to claim 1 wherein said decoding of the coded stream includes:
   counting the number N of subsequent zeros from the beginning of the coded stream;
   reading one bit of value one subsequent to the N number of zeros and N-bits subsequent to the one bit of value one; and
   obtaining, as to the different value, a value corresponding to the N-bits.

5. An apparatus for decoding a coded quantization matrix, said apparatus comprising:
   a decoding unit operable to decode a coded stream into a difference value ranging from −128 to +127;
   an addition unit operable to add together a value of an (I−1)th component in the quantization matrix, the difference value, and 256; and
   a calculation unit operable to calculate a remainder by dividing a result of said adding by 2 raised to 8-th power to obtain the value of the I-th component.

6. An integrated circuit for use in a decoding apparatus which decodes a coded quantization matrix, said integrated circuit comprising:
   an operation unit operable to:
   decode a coded stream into a difference value ranging from −128 to +127;
   add together a value of an (I−1)th component in the quantization matrix, the difference value, and 256; and
   calculate a remainder by dividing a result of said adding by 2 raised to 8-th power to obtain the value of an I-th component which is an integer equal to or smaller than 255.

7. A non-transitory computer readable recording medium for storing a program, which is used in a computer, for decoding a moving picture, said program causing a computer to execute steps for decoding a coded quantization matrix, wherein said steps include:
   decoding a coded stream into a difference value ranging from −128 to +127;
   adding together a value of an (I−1) the component in the quantization matrix, the difference value, and 256; and
   calculating a remainder by diving a result of said adding by 2 raised to 8-th power to obtain the value of an I-th component which is an integer equal to or smaller than 255.

* * * * *

UNITED STATES PATENT AND TRADEMARK OFFICE
CERTIFICATE OF CORRECTION

PATENT NO. : 7,912,122 B2
APPLICATION NO. : 10/569871
DATED : March 22, 2011
INVENTOR(S) : Shinya Kadono et al.

It is certified that error appears in the above-identified patent and that said Letters Patent is hereby corrected as shown below:

On the Front Page:
The residence city of the third inventor listed under "(75): Inventors" reads "Palos Verdes Peninsua, CA" but should read --Palos Verdes Peninsula, CA--

In the References Cited on Page 2 under "Foreign Patent Documents", Japanese Publication No. JP 02-235778 should read --JP 05-235778--

In the Claims:
Claim 7, Col. 24, line 20, "(I-1) the" should read --(I-1)th--

Signed and Sealed this
Sixteenth Day of August, 2011

David J. Kappos
*Director of the United States Patent and Trademark Office*